US007904450B2

(12) United States Patent
Wilson

(10) Patent No.: US 7,904,450 B2
(45) Date of Patent: Mar. 8, 2011

(54) PUBLIC ELECTRONIC DOCUMENT DATING LIST

(76) Inventor: Kelce S. Wilson, Murphy, TX (US)

( * ) Notice: Subject to any disclaimer, the term of this patent is extended or adjusted under 35 U.S.C. 154(b) by 253 days.

(21) Appl. No.: 12/110,282

(22) Filed: Apr. 25, 2008

(65) Prior Publication Data

US 2009/0100041 A1    Apr. 16, 2009

(51) Int. Cl.
*G06F 7/00* (2006.01)
(52) U.S. Cl. ...................................................... 707/723
(58) Field of Classification Search ................... 707/5
See application file for complete search history.

(56) References Cited

U.S. PATENT DOCUMENTS

| 6,285,999 | B1 | 9/2001 | Page |
| 6,799,176 | B1 | 9/2004 | Page |
| 7,058,628 | B1 | 6/2006 | Page |
| 7,269,587 | B1 | 9/2007 | Page |
| 2002/0023220 | A1* | 2/2002 | Kaplan .................. 713/176 |
| 2004/0230572 | A1* | 11/2004 | Omoigui ....................... 707/3 |
| 2006/0041550 | A1* | 2/2006 | Bennett et al. .................... 707/5 |

OTHER PUBLICATIONS

Wikipedia, Timestamp, Feb. 27, 2007, http://en.wikipedia.org/wiki/Time_stamp, printed on Mar. 19, 2007, 3 pages.
E-Timestamp, How a digital timestamp works, date unknown, http://www.e-timestamp.com/timestamp.htm, printed on Apr. 22, 2007, 2 pages.
Wikipedia, Trusted timestamping, Apr. 1, 2008, http://en.wikipedia.org/wiki/Trusted_timestamping, printed on Apr. 1, 2008, 3 pages.
Speedylook Encyclopedia, Wrap Soleau, date unknown, http://www.speedylook.com/wrap_soleau.html, printed on Apr. 1, 2009, 1 page.

* cited by examiner

*Primary Examiner* — Tony Mahmoudi
*Assistant Examiner* — Jensen Hu
(74) *Attorney, Agent, or Firm* — Kelce S. Wilson

(57) ABSTRACT

Systems and methods are disclosed which enable the establishment of file dates and the absence of tampering, even for documents held in secrecy and those stored in uncontrolled environments, but which does not require trusting a timestamping authority or document archival service. A trusted timestamping authority (TTSA) may be used, but even if the TTSA loses credibility or a challenger refuses to acknowledge the validity of a timestamp, a date for an electronic document may still be established. Systems and methods are disclosed which enable detection of file duplication in large collections of documents, which can improve searching for documents within the large collection.

16 Claims, 23 Drawing Sheets

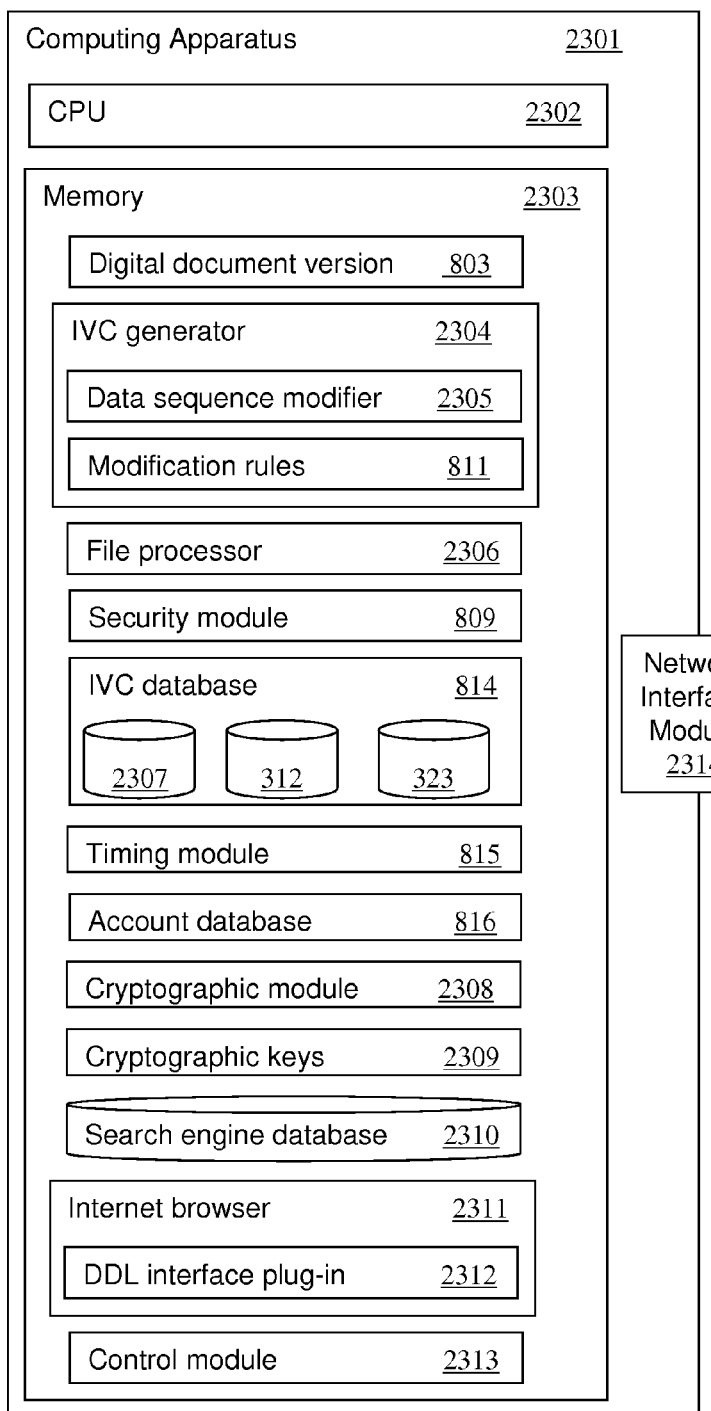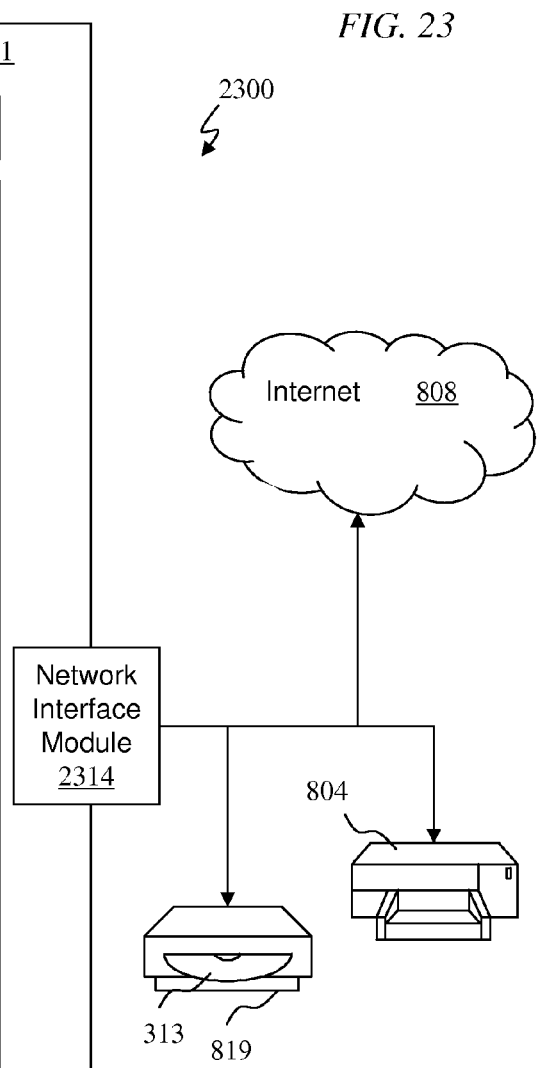
FIG. 23

PUBLIC ELECTRONIC DOCUMENT DATING LIST

TECHNICAL FIELD

The invention relates generally to information assurance. More particularly, and not by way of any limitation, the present application relates to tampering detection using cryptography and also to timestamping and establishment of an asserted date for a document.

BACKGROUND

The ability to easily and reliably establish that a document (a computer file) has existed as of a certain date, and further that is has not been altered by tampering since that date, has been an elusive target for certain types of documents. Document types for which an easy, reliable date proof has been a particularly elusive goal include 1) documents which have been kept in secrecy since their creation, as well as 2) documents which are retained in an uncontrolled or poorly-controlled environment, such as on a website that is susceptible to easy modification and alteration by computer hackers or even the website owner.

The ability to reliably date prove such documents could provide significant beneficial results. For example, in a patent dispute, if one party attempted to claim earlier development of an invention, by producing documents that had been previously held confidentially as trade secrets, the other side may bring accusations of backdating the documents. Using cryptographic methods as part of the proof that an electronic version of the document existed as of the claimed date, as well as to prove that no information had been added since that date, could reduce cost and uncertainties in comparison with the prevalent method of relying on human recollections and honesty in an adversarial legal proceeding. As used herein, the term document includes both humanly readable documents and other digital files, including data files, executable software programs, and files in encrypted, compressed, and/or fitting defined file formats. The term electronic document includes both word processing files, ASCII text files and other digital files, including data files, executable software programs, and files in encrypted, compressed, and/or fitting defined file formats.

Additionally, if a PTO examiner, performing a prior art search for a pending application, discovered a document on a website that allowed revisions to posted pages and used that document in a 35 U.S.C. §102 or 103 rejection, the patent applicant will challenge the rejection as relying on an improper reference, because it may have been revised to include the referenced passages after the application's priority date. The PTO currently has no response to such applicant arguments, unless an examiner is able to find a copy of the contested website document that had been archived in a reliable database prior to the claimable priority date. The PTO and other organizations facing similar document dating issues lack the resources to independently generate and maintain date-provable databases of all potentially valuable internet documents. Some internet document archiving services do exist, but due to storage requirements, these databases archive only a small percentage of available documents. Additionally, the selection of documents for retention is outside the control of most users who would later need to rely on the archive, and further, the purported dates of the archive entries can typically be questioned and contested by opponents in litigation.

A prime example of a failure by others, to solve the problem that it is currently cost-prohibitive to prove the dates of various revisions of document held in poorly-controlled environments, is that the PTO has policies against using many potentially valuable website pages in 35 U.S.C. §§102 and 103 rejections.

This is a significant matter. Either the PTO is inexplicably excluding a large amount of easily-searched information from the examination process, thereby denying patent examiners access to a valuable resource that could simultaneously ease their burden and improve patent quality, or else the PTO's policies are effectively an admission that a large-scale solution for reliably establishing dates for website pages has not been found and is therefore not obvious.

A prime example of a failure by others, to solve the problem that it is currently difficult to prove the dates of documents held in secrecy, is the relatively low adoption rate of trusted timestamping solutions. Some attempts have been made in the prior art to address date proving documents that are held in secrecy. However, these have so far failed to meaningfully solve certain problems and achieve widespread adoption, because they have multiple security vulnerabilities, require multiple conditions that are uncertain to exist, and are subject to compromise at unpredictable times.

Many industry experts, and even cryptographic standards organizations, teach away from the concept that establishing a document date is possible without all interested parties finding a common entity to trust for time keeping. That is, the current paradigm requires that the document author, or any other asserting party attempting to establish a document date, and the document challenger must both endorse a single entity's credibility, which cannot have been compromised or lost through unethical action by insiders, malicious activity, accident, or computational advances that render the trust mechanism obsolete.

One of the prior art solutions is to provide a copy of the document to a document archival services provider. At a later time, upon needing to establish the date of the document, the records of the document archival services provider are subpoenaed and used to establish the date that the document was placed in secure, archival storage. Unfortunately, this solution is expensive, due to storage and record-keeping requirements and so, as can be expected, relatively few organizations use such a service. It also has multiple security weaknesses, including potential corruption of the services provider employees; forgery of archival records unknown to the services provider; loss of the document by fire, flood or theft; and that the services provider is out of business at the time its services are needed to verify the document date.

Another prior art solution is to use a timestamp from a trusted timestamping authority (TTSA). The document author, who wishes to preserve a document in secrecy, can hash the document, send the hash value to the TTSA, who combines the submitted hash value with a timestamp, hashes the combination to produce a second hash value, digitally signs the second hash value with a private key, and returns the signed hash value along with the timestamp information to the document author. The document author then stores the signed second hash and timestamp information with the original document.

At a later time, upon needing to establish the date of the document as that indicated by the timestamp, a verification process is performed. The document is hashed again by a party trusted by both the document author and the party challenging the document's asserted date, and the hash value is combined with the timestamp. This combination is then hashed to produce yet another hash value for final verification. In parallel, the digitally signed hash value provided by the TTSA is decrypted with the TTSA's public key, and the result is compared with the final verification hash value. If there is a match, the TTSA's credibility is used as the basis for trusting the document date indicated by the timestamp.

However, this process requires some critical assumptions and carries significant risk. The TTSA must be trustworthy, the TTSA's private key must not have been secretly compromised, and the TTSA's public key must be available from a trusted source at the later date, when the document is challenged. If the TTSA is corrupt, or even if it is trustworthy, but the document challenger is skeptical, then this prior art scheme will not work to convince the challenger of the document's date. Even worse, if the TTSA's private key is ever stolen, all documents, for which the timestamps had been signed by the stolen key, lose their date provability unless some type of remedial action is taken. A mere single careless act by one employee of the TTSA, or only a single successful hacking attempt, is required to defeat this entire prior art trusted timestamping system. Further, similar to the reliance on the document archival services provider remaining in business, if the TTSA ever ceases operations, it may be difficult to prove the date of a document. This is because the TTSA is no longer around to confirm the validity of its public key. Anyone asserting that a document has been timestamped by a defunct TTSA can identify any key as the alleged public key, and the TTSA entity won't exist to refute the assertion, allowing the possibility of a forgery.

Thus, there exists a need to establish a system for reliable date proof and tamper indication of documents, which is not vulnerable to the security weaknesses and risks of the current trusted timestamping and archival processes, and is further easier to use, more reliable, and likely less expensive than using either a TTSA or a document archival services provider. U.S. Pat. No. 6,285,999 ('999); U.S. Pat. No. 6,799,176 ('176); U.S. Pat. No. 7,058,628 ('628); and 7,269,587 ('587) to Page (collectively "Page"), are hereby incorporated by reference as teachings of prior art.

SUMMARY

Embodiments of the invention solve problems that have been previously unsolved, for example, proving the date of a document and the lack of any alteration when a challenger of a document date does not trust the timestamping provider or refuses to acknowledge the validity of a timestamp. Embodiments of the invention thus provide a surprising result that contradicts the teachings of the prior art: The need for trusting a timestamping authority can be eliminated in many situations, even when a document is stored in secrecy under the exclusive control and possession of an untrustworthy party.

Embodiments of the invention solve another problem that has been previously unsolved: An asserted date of a document, and the lack of any alteration, can be established even when a document has been stored in an uncontrolled environment. Embodiments of the invention thus provide another surprising result: Website pages stored on a website controlled by any website operator can be reliably dated at a later time, and proven to have remained unaltered, even if the website operator is untrustworthy.

Using an embodiment of the invention, any entity, for example the PTO, a search engine operator, or a litigation party, can reliably assert and prove a date that a website document was available to the public, even without the expense of maintaining an independent archival copy of the document or using either a trusted document archival service or a trusted timestamping authority (TTSA).

Embodiments of the invention introduce a new paradigm: Information necessary to prove or disprove the existence and integrity of a document is distributed outside the control of the document author, or other party seeking to establish a date, and is linked to comparable information for other documents, so that any one of multiple disinterested parties can furnish proof of the asserted document date when needed. When any challenging party wishes to challenge a claimed document date, the asserting party, whether the author or another entity, issues a counter-challenge: refute the credibility of all disinterested parties possessing the information, because the credibility of only a single one, even if unwilling and uncooperative, is necessary to prove the asserted date.

Some embodiments of the invention allow for an exceptionally unique situation: A party challenging an asserted date of a document may actually have previously asserted the date and integrity of the very same information used as the basis for the currently contested document date. In many of these situations, once the challenger is aware that the same information, previously endorsed by the challenger, can prove the date of the currently contested document, the challenger will have no choice but to withdraw the challenge and admit to the asserted date.

The foregoing has outlined rather broadly the features and advantages of the invention in order that the detailed description may be better understood. Additional features and advantages will be described hereinafter, which form the subject of the claims of the invention. It should be appreciated by those skilled in the art that the conception and specific embodiments disclosed may be readily utilized as a basis for modifying or designing other structures or methods for carrying out the same purposes. It should also be realized by those skilled in the art that such equivalent constructions do not depart from the spirit and scope of the invention as set forth in the claims. The novel features which are believed to be characteristic of the invention, both as to its organization and method of operation, will be better understood from the following description, when considered in connection with the accompanying figures. It is to be understood, however, that each of the figures is provided for the purpose of illustration and description only, and is not intended as a definition of the limits of the invention.

BRIEF DESCRIPTION OF THE DRAWINGS

For a more complete understanding of the present invention, reference is now made to the following descriptions taken in conjunction with the accompanying drawings, in which:

FIG. 23 illustrates another embodiment of a DDL apparatus.

DETAILED DESCRIPTION OF THE INVENTION

Figure 1:
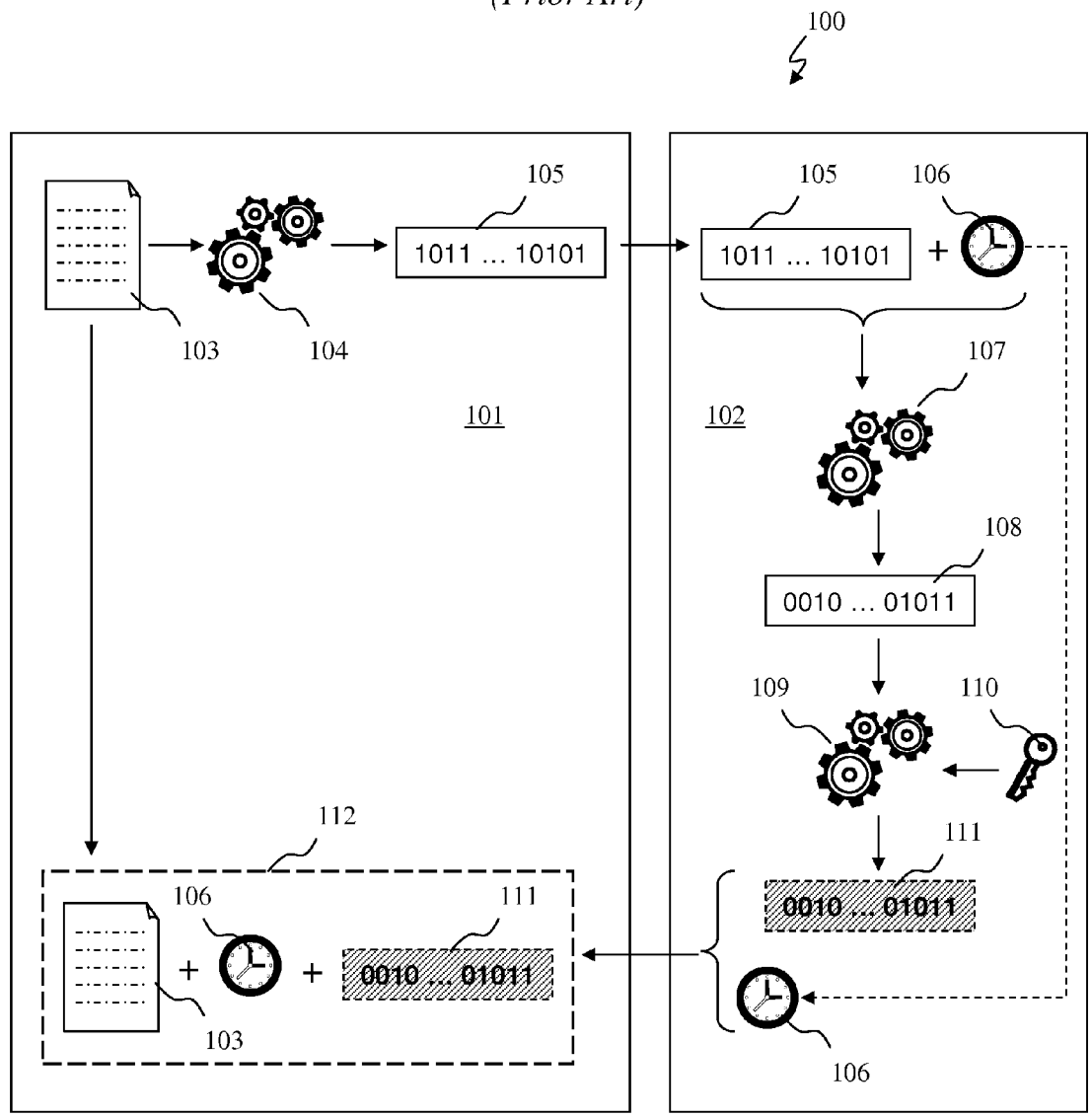
FIG. 1 illustrates a prior art trusted timestamping system.

Terms are often used incorrectly in the information assurance field, particularly with regard to tamper detection. For example, the term "tamper proof" is often used incorrectly. A tamper proof article is effectively impervious to tampering, which is often described as unauthorized alteration. Few articles qualify for such a designation. "Tamper resistant" is also often used incorrectly when a more appropriate proper term would be "tamper evident". A tamper resistant article is one for which an act of tampering is difficult, although possible, to accomplish. A tamper evident article is one for which tampering is detectable, independent of whether the tampering itself is easy or difficult to accomplish.

A document associated with an integrity verification code (IVC), for example a hash value from the secure hash algorithm (SHA) family of functions, is better described as tamper evident, rather than tamper proof or tamper resistant. A document dating list (DDL), for example an embodiment of a public electronic document dating list (PEDDaL™), which comprises a listing of IVCs optionally associated with timestamps, provides a repository of information that is useable in ascertaining whether a particular document has been tampered. A description of IVC generation is provided in FIG. 1, the description of FIG. 1, and other figures and descriptions in U.S. patent application Ser. No. 12/053,560, "DOCUMENT INTEGRITY VERIFICATION", the initial disclosure of which is hereby incorporated by reference. However, it should be understood that other methods of generating an IVC may be used, other than the referenced page verification for printed documents (PaVePaD™) system, and that it is not necessary to modify data sequences prior to generating an IVC for entry into a DDL record.

Embodiments of the invention solve problems that have been previously unsolved, for example, proving the date of a document and the lack of any alteration when a challenger of a document date does not trust the timestamping provider or refuses to acknowledge the validity of a timestamp. Embodiments of the invention thus provide a surprising result that contradicts the teachings of the prior art: The need for trusting a timestamping authority can be eliminated in many situations, even when a document is stored in secrecy under the exclusive control and possession of an untrustworthy party.

Embodiments of the invention solve another problem that has been previously unsolved: An asserted date of a document, and the lack of any alteration, can be established even when a document has been stored in an uncontrolled environment. Embodiments of the invention thus provide another surprising result: Website pages stored on a website controlled by any website operator can be reliably dated at a later time, and proven to have remained unaltered, even if the website operator is untrustworthy.

Using an embodiment of the invention, any entity, for example the PTO, a search engine operator, or a litigation party, can reliably assert and prove a date that a website document was available to the public, even without the expense of maintaining an independent archival copy of the document or using either a trusted document archival service or a trusted timestamping authority (TTSA).

Referring now to the figures, FIG. 1 illustrates a prior art trusted timestamping system 100, which uses a TTSA 102. In prior art system 100, the document author's computing resources 101 exchange information with TTSA 102. A document 103 is created and hashed with a hash function 104 to produce a document hash value 105, which is communicated to TTSA 102. Upon receiving document hash value 105, TTSA 102 generates a timestamp 106, appends it to document hash value 105, and hashes the combination with hash function 107 to produce a timing hash value 108. Hash functions 104 and 107 may be identical, but this is not required. Timing hash value 108 is encrypted with public key encryption module 109 using the private key 110 of TTSA 102 to produce encrypted hash value 111. Encrypted hash value 111 and timestamp 106 are communicated back to author's computing resources 101 to be combined with document 103 in a document record 112. Document 103 is thus timestamped and ready to be date proven at a later time. It is important to note that timestamp 106 does not establish when document 103 was created, but only establishes when document hash value 105 was received by TTSA 102. That is, if document 103 is many years old upon initiation of the timestamping process, timestamp 106 will not reflect the actual earlier creation date, but rather only the later date that document hash value 105 was received by TTSA 102.

Figure 2:
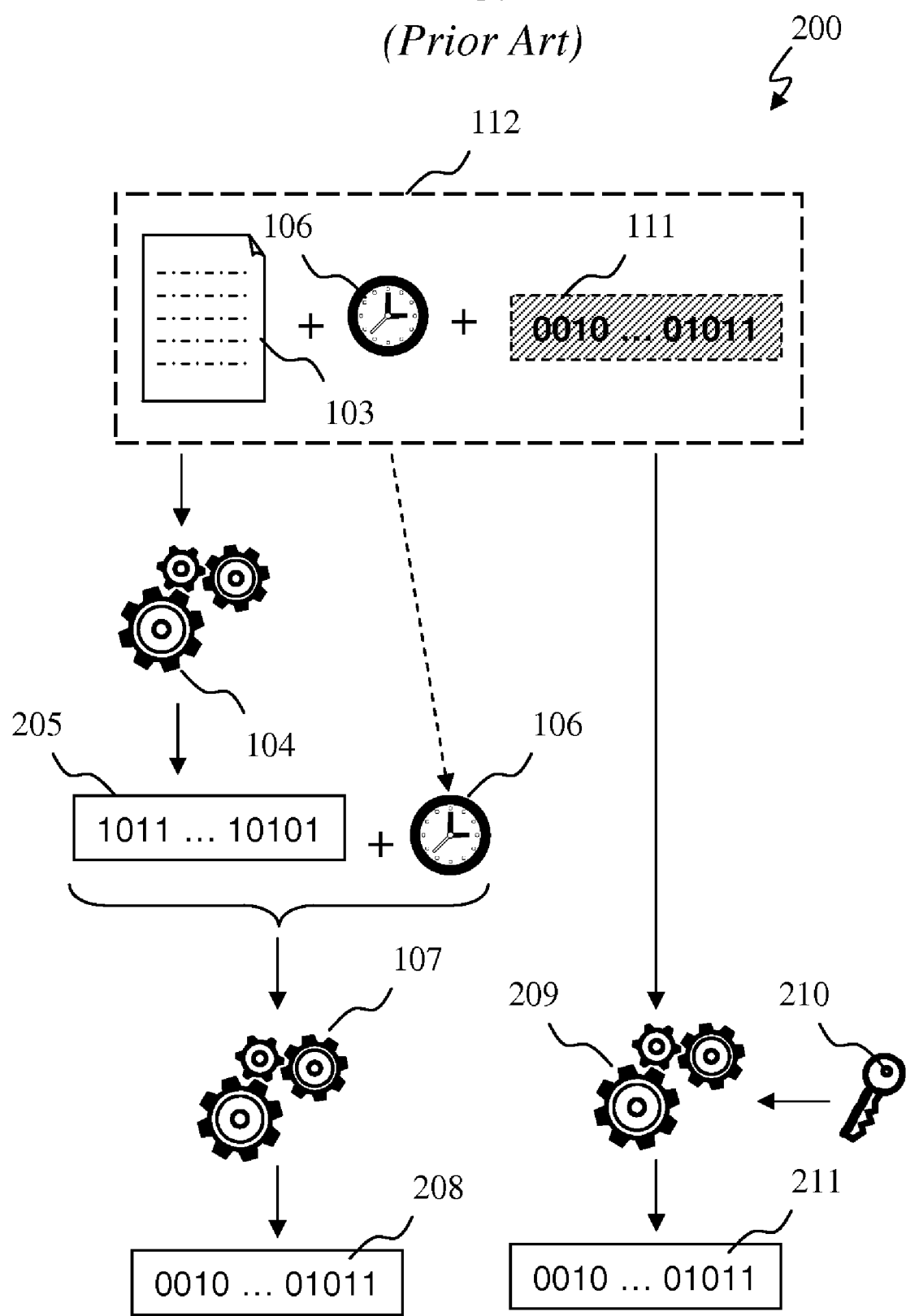
FIG. 2 illustrates a prior art system for validating a timestamp generated in accordance with the illustrated prior art system of FIG. 1.

Upon a need arising for the author to establish the timestamping date of document 103, prior art system 200 illustrated in FIG. 2 is used. The document author provides a copy of document record 112 to an intermediary, trusted by both the author and a challenger, who is challenging the author's asserted timestamping date of the document. The intermediary may be TTSA 102 or may be a different entity. While the author might assert any creation date for document 103 earlier than the date indicated by timestamp 106, prior art system 200 is used to verify the date of timestamp 106. An earlier creation date than the date of timestamp 106 cannot be established by prior art system 200 alone.

The intermediary separates the components of document record 112 into document 103, timestamp 106, and encrypted hash value 111. Document 103 is hashed by hash function 104, which is a copy of the same function originally used by the document author to generate document hash value 105. This produces second document hash value 205, which should be identical to the earlier-generated document hash value 105, used in generating timing hash value 108 and then encrypted hash value 111. Second document hash value 205 is combined with timestamp 106 and hashed using hash function 107, which is a copy of the same function originally used by TTSA 102 to generate timing hash value 108. This produces test hash value 208, which should be identical to earlier timing hash value 108, used in generating encrypted hash value 111. Encrypted hash value 111 is decrypted with public key decryption module 209 using the public key 210 of TTSA 102 to produce verification value 211. Public key decryption module 209 and public key 210 correspond to public key encryption module 109 and private key 110, respectively. If test hash value 208 matches verification value 211, then the intermediary has established at least two things: test hash value 208 matches timing hash value 108, and public key 210 corresponds to private key 110. Upon both of these conditions being true, the TTSA 102's credibility can be used to prove the validity of timestamp 106. If either condition is untrue, or there is another problem with prior art system 200, test hash value 208 will differ from verification value 211, and the date of timestamp 106 will be unverified.

It is important to note that the usefulness of prior art systems 100 and 200 is degraded if any of the following occur: 1) TTSA 102 ceases business operations and cannot certify its public key; 2) TTSA 102 ceases business operations and its public key cannot be found; 3) an employee of TTSA 102 is discovered to be corrupt; 4) private key 110 is stolen by an intruder or computer hacker; 5) private key 110 is compromised through social engineering; 6) private key 110 is cracked through computing technology advances; 7) the timestamping equipment of TTSA 102, generating timestamp 106, is suspected of inaccuracies; or 8) a challenger refuses, for any reason, to acknowledge the credibility of TTSA 102.

It should be noted that, in many situations, the credibility of TTSA 102 may be regional, such as generally accepted in some regions while generally rejected in others. An example of this would occur if TTSA 102 operated in a first country and a document challenger came from a second country, which had a long history of political animosity and distrust toward the first country. In such a situation, prior art systems 100 and 200 would have little practical value, even if operated with flawless integrity and accuracy.

Prior art systems 100 and 200 cannot protect against accidental key compromises, TTSA employee corruption, or even arbitrary, baseless distrust of TTSA 102. As a result, prior art systems 100 and 200 have experienced limited rates of adoption.

Figure 3:
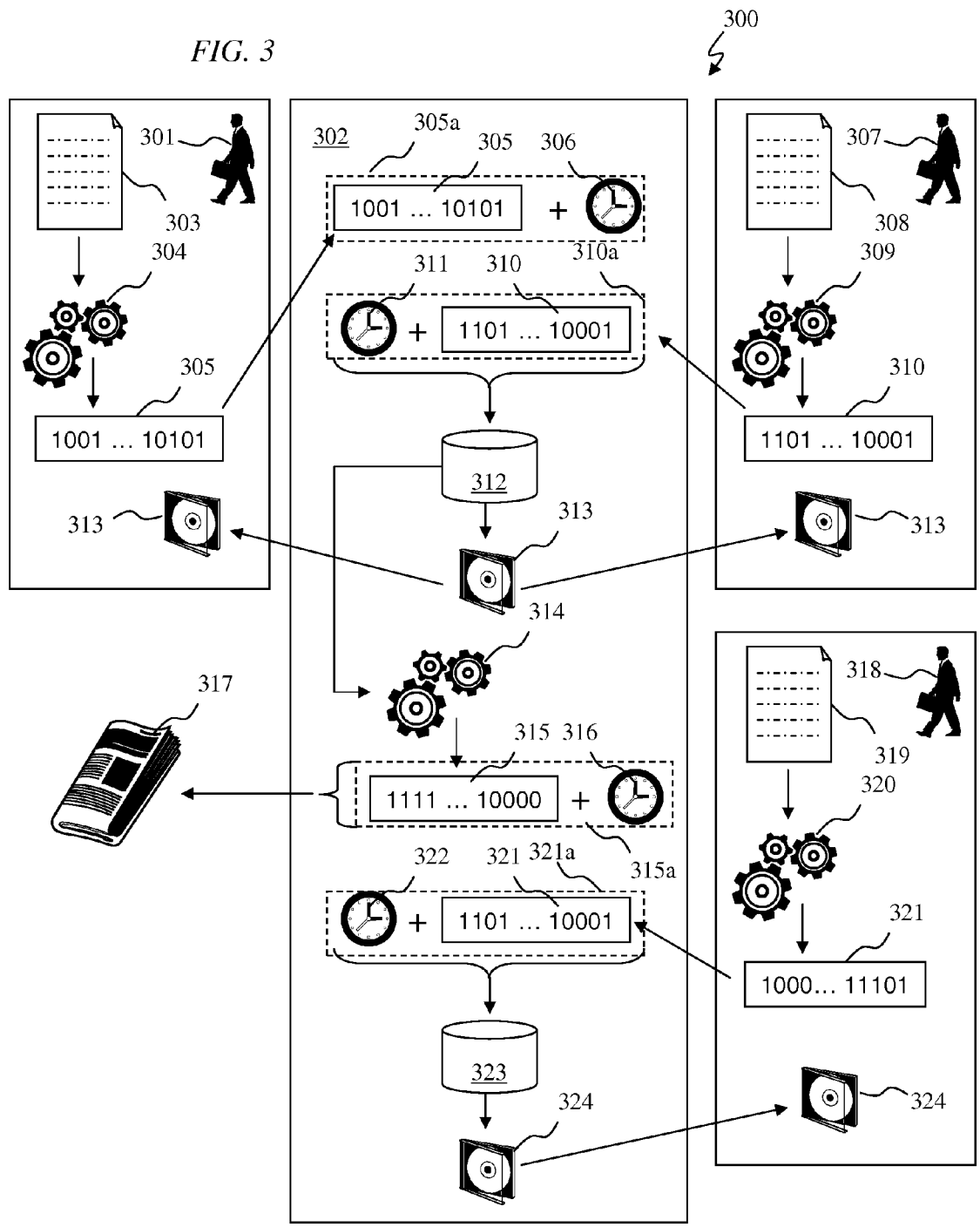
FIG. 3 illustrates an embodiment of a document dating list (DDL) system.

FIG. 3 illustrates an embodiment of a DDL system 300, which overcomes multiple security vulnerabilities and other risks inherent in prior art system 100 of FIG. 1. System 300 empowers multiple disinterested parties to prove or disprove an asserted file date, so that only a single one of the multiple parties is needed to establish the date. In some situations, the document challenger itself may actually be the party that furnishes the proof for the validity of an asserted document date, using the challenger's own business records. Some embodiments may use a TTSA, if available, others use a timestamping authority (TSA) that does not meet established standards for a TTSA, and some embodiments may not use timestamps.

Embodiments of system 300 enable the proof of asserted document dates and proof of the absence of tampering, even for documents held in secrecy and those stored in uncontrolled environments, without requiring a challenger to trust a timestamping authority or the records of a document archival service. TTSA 102 may be used to generate timestamps, operating in the capacity shown for a TSA 302, but even if TSA 302 loses credibility or ceases business operations, an asserted document date may still be established.

In system 300, a first record submitter 301 exchanges information with TSA 302, which provides a DDL service. Two editions of a DDL are illustrated in FIG. 3, a first DDL edition 312 and a second DDL edition 323, both of which are described later in more detail. It should be understood that a timestamp is not necessary for operation of some embodiments, and for such embodiments, TSA 302 becomes a DDL manager rather than a timestamping authority. However, for the purposes of more detailed explanation, timestamps are included in the description of the illustrated embodiment.

First record submitter 301 obtains a first document 303 and processes it with an IVC generator 304 to produce an IVC 305, which represents at least a portion of first document 303. First record submitter 301 may or may not be the author of first document 303. In some embodiments, IVC 305 represents a collection of multiple documents. In some embodiments, first record submitter 301 obtains IVC generator 304 from TSA 302. In some embodiments, IVC generator 304 is not local to first record submitter 301, but is instead located on remote computing resources requiring that a copy of document 303 be sent for processing and generation of IVC 305. IVC 305 is communicated to TSA 302. In some embodiments, additional information accompanies IVC 305, such as an identification of IVC generator 304, IVC generation rules, software version, a generated timestamp generated by a DDL submitter, and user account information, so that TSA 302 can collect payment for providing DDL services. Upon receiving IVC 305, TSA 302 generates a timestamp 306 and combines it with IVC 305 to produce a document record 305a. Document records generated by TSA 302, such as document record 305a, may contain extra information, including an identification code for the submitter, unless the submission process is anonymous. Other possible information includes an indexing or a record count number, and other information that may enhance the utility of a DDL edition. A record may include information enabling trusted timestamping validation, for example a copy of a signed hash, such as encrypted hash value 111.

A second record submitter 307 obtains a second document 308 and processes it with an IVC generator 309 to produce an IVC 310, which represents at least a portion of second document 308. Second record submitter 307 may or may not be the author of second document 308. IVC generator 309 may be similar in function to IVC generator 304, although this is not a requirement. As with the generation of IVC 305, the IVC processing may be remote, and the resulting IVC may actually represent more than just a single document. IVC 310 is communicated to TSA 302, and may be accompanied by additional information. Upon receiving IVC 310, TSA 302 generates a timestamp 311 and combines it with IVC 310 to produce a document record 310a. Both record 305a and record 310a are added to first DDL edition 312, which is written to a media 313 and sent to both first record submitter 301 and to second record submitter 307. First DDL edition 312 may contain additional records, such as records from many other submitters, and may be closed for writing to media 313 on a regular schedule, such as hourly, daily, weekly, monthly or annually, or when reaching a certain size, such as large enough to fill media 313 to some threshold. In the illustrated embodiment, media 313 is a computer readable medium, shown as a compact disk (CD) or a digital versatile disk (DVD), although it can comprise magnetic storage, random access memory (RAM), either volatile or non-volatile, or another form of data storage. In some embodiments, media 313 is a permanent, read-only media after it has been written with first DDL edition 312. In some embodiments though, media 313 may be substituted with a humanly-readable media, which may also be suitable for an optical character recognition (OCR) process. In some embodiments, first DDL edition 312 is sent out electronically, such as in an email or an equivalent, to first and second record submitters 301 and 307, in addition to others.

With the arrangement illustrated in FIG. 3, both first record submitter 301 and second record submitter 307 each possess copies of the other's document IVC, 305 and 310 respectively, because each has a copy of first DDL edition 312. Therefore, first record submitter 301 is in a position to provide evidence of the existence and integrity of second document 308 as of the date that first record submitter 301 received media 313, even though first record submitter 301 may have never possessed a copy of second document 308 and may be entirely unaware of its contents. Likewise, second record submitter 307 is in a position to provide evidence of the existence and integrity of first document 303 as of the date that second record submitter 307 received media 313, even though second record submitter 307 may have never possessed first document 303 and may be entirely unaware of its contents. Further, if TSA 302 emailed out copies of first DDL edition 312, and/or placed a copy of first DDL edition 312 on a publicly accessible website, anyone with access to the emails or website could obtain a copy of first DDL edition 312, and with it, the means to furnish evidence of the existence and lack of tampering to both first document 303 and second document 308, as of the date that first DDL edition 312 was electronically distributed. Additionally, any entities receiving a copy of media 313, which might include non-submitters, such as libraries, law firms, and even secure archival services providers, will be in a position to furnish dispositive evidence of both the existence and integrity of both first document 303 and second document 308 using normal business records, even without ever having possessed a copy of either document.

On a large scale, many thousands, or even millions, of people are put into a position of being able to provide evidence of the existence and absence of tampering for millions of documents, or even more, without ever knowing their contents. In order to establish a date at a later time though, at least some of the people or entities involved will need to keep records indicating the date at which a copy of first DDL edition 312 was obtained. However, records suitable for proving past dates of certain events, such as having received an item in the mail, are often kept in the ordinary course of business by many entities. This existing activity can be leveraged at a later time, when an asserted date and integrity for first document 303 and/or second document 308 needs to be established.

When providing DDL service, TSA 302 may require that a submitter assign any copyrights in the components of a record to TSA 302, and may further copyright DDL editions. TSA 302 may distribute media 313 and/or other copies of DDL edition 312 free or for a fee. TSA 302 may engage the services of trusted document archival services providers for retaining copies of media 313, or even use one or more TTSAs to timestamp DDL editions in accordance with system 100, shown in FIG. 1.

TSA 302 additionally processes first DDL edition 312 with an IVC generator 314 to produce an IVC 315, which represents at least a portion of first DDL edition 312. IVC generator 314 may be similar in function to IVC generator 304, although this is not a requirement. IVC 315 is combined with a timestamp 316 to produce a document record 315a. In the illustrated embodiment, at least a portion of record 315a is sent to a public record 317, for example by publishing a notice in the classified advertisement section of a newspaper listing all or a substantial part of IVC 315. Timestamp 316 may also be included in the submission to public record 317. Other public recording systems may be used in addition to or in place of a newspaper announcement. Some DDL editions, however, may be limited to distribution only among submitters or other defined classes of recipients.

A third record submitter 318 obtains a third document 319, and processes it with an IVC generator 320 to produce an IVC 321, which represents at least a portion of third document 319. Third record submitter 318 may or may not be the author of third document 319. IVC generator 320 may be similar in function to IVC generator 304, although this is not a requirement. As with the generation of IVC 305, the IVC processing may be remote, and the resulting IVC may actually represent more than just a single document. IVC 321 is communicated to TSA 302, and may be accompanied by additional information. Upon receiving IVC 321, TSA 302 generates a timestamp 322 and combines it with IVC 321 to produce a document record 321a. It should be understood that, although IVCs 305, 310, 315 and 321 are described in sequence, the only requirement for the order of generation is that IVCs 305 and 310 be generated prior to IVC 315, so that IVC 315 may represent them. It should also be understood that the reference to documents, such as for documents 103, 303, 308, and 319 is a generic term, and includes any type of computer file suitable for generating an IVC, including executable computer programs and data files.

Record 315a and record 321a are added to second DDL edition 323, which is written to media 324 and sent to third record submitter 318. As with distribution of first DDL edition 312, distribution of second DDL edition 323 may take many forms and include recipients other than IVC submitters. In some embodiments, one or more submitters may not receive a copy of a DDL edition containing their submitted IVC, but may instead rely on the widespread distribution of the DDL edition to find a copy at a later time, if needed.

By including IVC 315 in second DDL edition 323, second DDL edition 323 then provides evidence of the existence and integrity of first DDL edition 312 and therefore, all documents represented by first DDL edition 312. By iterating this process, each subsequent DDL edition builds upon prior submissions, becoming a cumulative record. A series of DDL editions can thus be chained, so that anyone possessing a copy of a particular DDL edition can then infer the existence and integrity of all DDL editions earlier in the chain, up through the initial DDL edition, which may be earlier than first DDL edition 312.

One possible example of a DDL record format is given by the following 1024 bit (1 Kb) sequence, although other record formats may be used:

Bits 1-512, (512): SHA-512 message digest;
Bits 513-672 (160): SHA-1 message digest;
Bits 673-696 (24): identification code for hash functions and software version;
Bits 697-760 (64): timestamp in clear text;
Bits 761-952 (192): encrypted timestamp record (signed TTSA record);
Bits 953-968 (16): identification code for timestamp source (TSA or TTSA);
Bits 969-984 (16): reserved;
Bits 985-1024 (40): record index.

Bits 1-696 of the record are generated by the IVC submitter, and TSA 302 provides the remainder, possibly obtaining the TTSA record from an outside TTSA such as TTSA 102. The timestamp may be a simple count of the number of seconds elapsed since a defined start time, or may be a different value. In order to include a signed TTSA record in a compact allocated space, it may require modified generation compared with prior art methods, if the TTSA record is otherwise too long. One example is that 64 bits of the timestamp, 64 bits from a portion of the SHA-512 message digest, and 64 bits from a portion of the SHA-1 message digest, for a total of 192 bits, are encrypted with the TTSA's private key. The record index may be cumulative, or may be reset from one DDL edition to the next. Any fields not used may be left blank.

The use of multiple hash function versions helps preserve trust in the record in the event that one of the hash functions is cracked. Another option is to nest different hash functions, and append a prior-calculated hash value to a document when it is hashed at a later time, with the other algorithm. As an example, bits 1-672 could be {S2(file+S1(file))+S1(file+S2 (file))}, where S1 is SHA-1 and S2 is SHA-2. Other IVC generators may be used, including ones with differently sized message digests than those used in the example.

System 100 creates a multitude of disinterested, potential third-party witnesses having evidence that can later be used to establish that documents 303, 308 and 319 existed, and have not since been modified, as of the dates that the applicable one of DDL editions 312 and 323, or a later chained edition, was obtained. The business records of one of these disinterested parties can then be used by one of record submitters 301, 307 and 318 to prove the date that the DDL edition was received. This can be accomplished without unnecessarily disclosing the contents of the documents involved, preserving secrecy.

Figure 4:
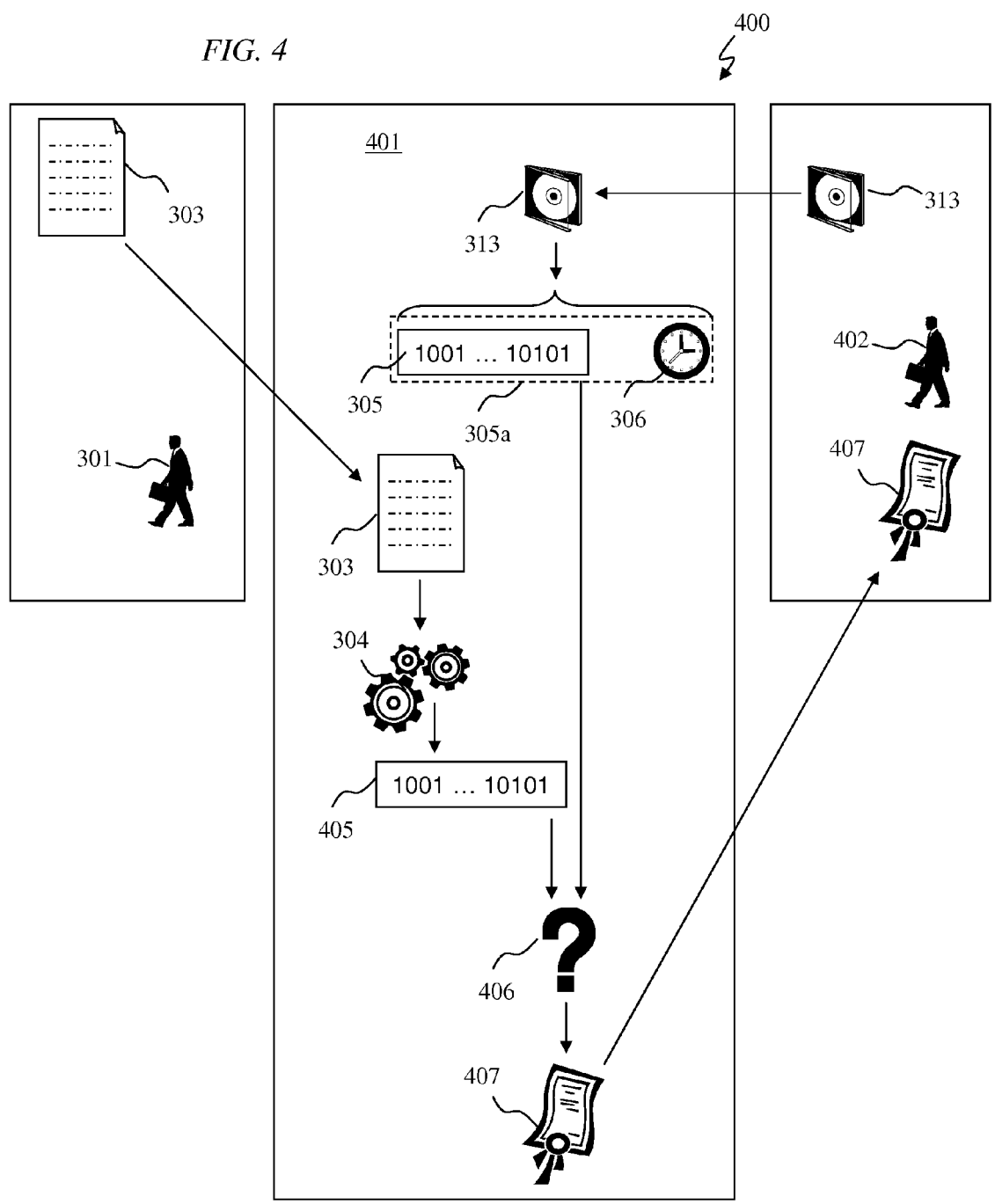
FIG. 4 illustrates a system for proving an asserted date for a DDL record generated in accordance with the illustrated system of FIG. 3.
Figure 5:
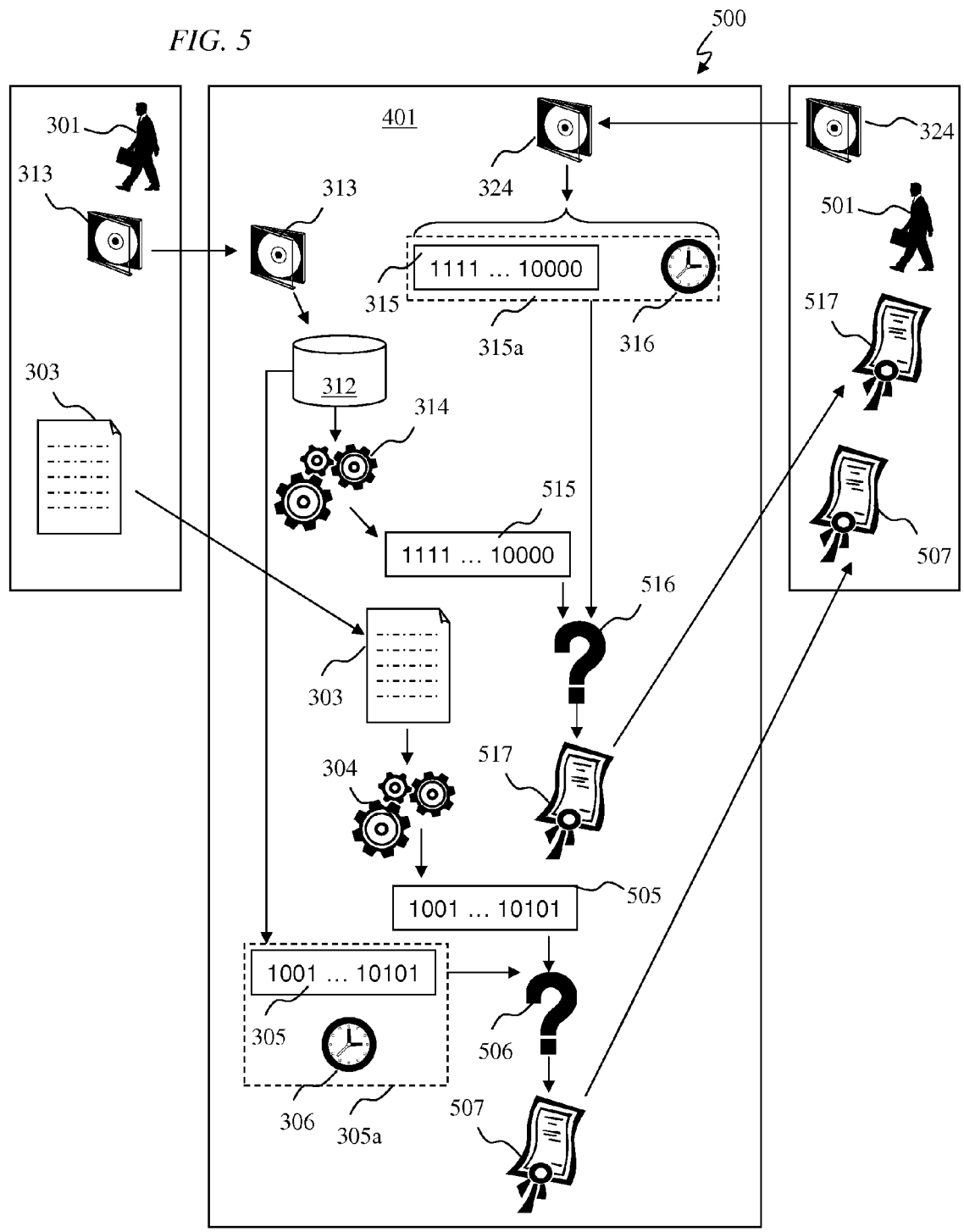
FIG. 5 illustrates another system for proving an asserted date for a DDL record generated in accordance with the illustrated system of FIG. 3.
Figure 6:
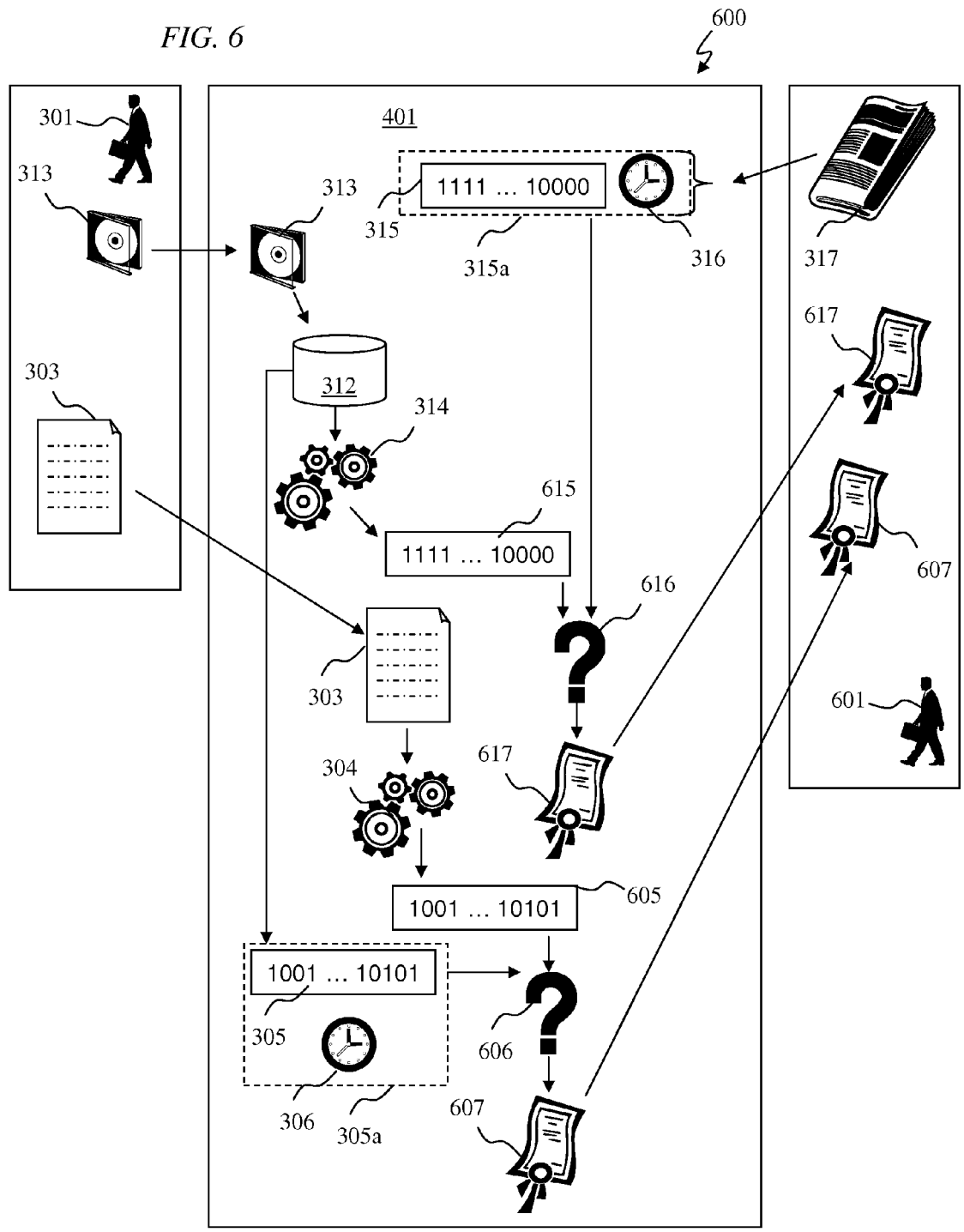
FIG. 6 illustrates another system for proving an asserted date for a DDL record generated in accordance with the illustrated system of FIG. 3.

Upon the need arising for record submitter 301 to establish a date for document 303, one or more of systems 400, 500 or 600, illustrated in FIGS. 4-6, may be used. While record submitter 301 might desire to assert a creation date for document 303 prior to that indicated by timestamp 306, systems 400 and 500 will be able to verify the date of timestamp 306 if TSA 302 is trusted, or a worse-case date that media 313 or 324 was received by another DDL edition recipient. System 600 will similarly be able to establish the worst-case date that IVC 315 was published in public record 317. Therefore, in many situations, a record submitter may be limited to asserting a date for a document that can be established by one of systems 400, 500 or 600, rather than a creation date. It should be understood, however, that any entity, unrelated to the author of a document, may use one or more of systems 300, 400, 500 and 600 to prove an asserted date for a document, and further, that in some situations, for example in a criminal trial, proving the date and integrity of a document may actually work against the wishes of the document author.

FIG. 4 illustrates a system 400 for proving an asserted date for document 303 by proving the date that first DDL edition 312 was publicly distributed. In the illustration of system 400, a trusted intermediary (TI) 401 is used to counter challenges to the claims of record submitter 301 by a document challenger 402, regarding the prior existence and integrity of document 303. TI 401 may be the same entity as TSA 302, or may be an independent entity. In some situations, document challenger 402 may actually perform some of the functions of TI 401. It should be understood that the systems illustrated in FIGS. 4-6, along with other methods disclosed herein, may be used to establish the date of any digital file storable on a computer, and are not limited to humanly-readable documents.

If challenger 402 is the same entity as record submitter 307, then challenger 402 has possession of media 313 and, presumably, business records indicating when media 313 was received. In this situation, records maintained under the control of challenger 402 actually provide dispositive evidence regarding the claim being challenged, the asserted date and/or integrity of document 303. This situation may not be entirely improbable if, for example, both record submitter 301 and challenger 402, a.k.a. record submitter 307, both operate in an industry that uses the services of TSA 302 for intellectual property (IP) protection or other record-keeping.

If however, challenger 402 does not have possession of media 313, TI 401 requests that challenger 402 obtain a copy of media 313 from any source trusted by challenger 402 to maintain reliable records. That is, challenger 402 can select the source for a copy of media 313 from any entity possessing a copy, and is not limited to trusting the records of TSA 302, TI 401, or record submitter 301. However obtained, TI 401 is illustrated as possessing a copy of media 313, or at least a copy of IVC 305. In the illustrated embodiment, TI 401 identifies record 305*a* on media 313, possibly under instructions from record submitter 301, since record submitter 301 is likely to know either the value of IVC 305, or else a record index number or some other way to identify record 305*a* on media 313 and/or any other copy of first DDL edition 312.

Because media 313 represents IVCs for multiple documents from multiple submitters, there are many independent entities, in addition to record submitter 301, who have an interest in establishing the date on which media 313 was written and distributed. One of those parties might actually be challenger 402, which is a scenario that is not exploitable by prior art systems 100 and 200. By submitting IVC 305 to first DDL edition 312, record submitter 301 is able to do something not facilitated by prior art systems 100 and 200: leverage the predictable self-interests of other entities to assist pursuing the interests of record submitter 301. Embodiments enable another fundamentally different operation over the prior art: An IVC used to establish an asserted date may be one that is stored outside the control of the entity asserting the date. It should be understood, however, that in some embodiments, a copy stored by record submitter 301 may be used, for example, if challenger 402 accepts the reliability of that copy. In contrast with prior art system 200, which relies on a hash value which is stored in record 112 under the control of the entity asserting a date for document 103, FIG. 4 illustrates a scenario in which an IVC stored under the control of an entirely different entity, not the one asserting a date for document 303, is used to establish the date.

TI 401 independently generates an IVC 405 from a copy of document 303, using a copy of IVC generator 304, which was originally used to produce IVC 305. Although illustrated that record submitter 301 provides a copy of document 303, TI 401 may obtain the copy of document 303 from another source possessing one, possibly challenger 402 or an independent source. TI 401 may have already been in possession of a copy of IVC generator 304, or may have requested one from TSA 302. If record 305*a* contained an identification of IVC generator 304, and possibly a specific software version in the case that IVC generator 304 contained an implementation flaw, TI 401 would have the information to select IVC generator 304 from among a collection of possible IVC generators. For example, IVC generator 304 may be SHA-1, SHA-2, which comprises SHA-224, SHA-256, SHA-348 and SHA-512, MD-5, another hash function, or any other function suitable to generate a value that can be later used for an integrity decision. TI 401 then compares the provided copy of IVC 305 with independently generated IVC 405 with comparison processor 406. Comparison processor 406 may be a computing device performing an equality check, or could be a simple human reading of two values on a video display or in printed form. In some embodiments, if the copy of IVC 305 from record 305a is only a partial section, that section is compared with the corresponding partial section of IVC 405. Responsive to a match, TI 401 issues validation certificate 407, and provides it to challenger 402. In some situations, for example during litigation, validation certificate 407 may be provided to a court.

Validation certificate 407 validates that IVC 405, independently generated by TI 401, matches IVC 305, which had been provided for the comparison. Although validation certificate 407 may mention the time and date indicated by timestamp 306, this time and date is generally not certified as accurate, unless timestamp 306 came from a TTSA, or another method of assuring accuracy is available. Trusting a timestamp from a TTSA may require that the timestamp, or an accompanying copy, be encrypted with the TTSA's private key. In some embodiments, establishing the asserted date of document 303 requires further effort, including examining records that indicate the date media 313 was written, or the date that a copy of first DDL edition 312 was available, if media 313 is not used. In such embodiments, validation certificate 407 is part of a collection of evidence which, when examined together, establishes the date of document 303, and its integrity, as of the date that reliable records indicate that IVC 305 had been distributed outside the control of record submitter 301.

In some situations, if an IVC was printed on a face of document 303, for example in accordance with the teachings of U.S. patent application Ser. No. 12/053,560, the printed IVC may be used for an initial comparison with IVC 305, and then verified against IVC 405, if necessary. In some situations, if document 303 had entered the public domain, or record submitter 301 felt no need to keep the contents of document 303 secret from document challenger 402, and document challenger 402 could be trusted to perform an independent verification properly, record submitter 301 can optionally simply ensure that document challenger 402 has an intact copy of document 303, so that document challenger 402 performs the role of TSA 401. However, as illustrated in FIG. 4, with a third party TSA 401 acting as a trusted intermediary, system 400 enables record submitter 301 to establish an asserted date for document 303, even without unnecessarily risking disclosure of its contents.

FIG. 5 illustrates a system 500 for proving an asserted date for document 303 by proving a date that first DDL edition 312 was publicly distributed, through chaining subsequent DDL editions. In the illustration of system 500, TI 401 is used to counter challenges to the claims of record submitter 301 by a document challenger 501, regarding the prior existence and integrity of document 303. In the illustrated embodiment, record submitter 301 provides TI 401 with copies of media 313 and document 303, although it should be understood that TI 401 may obtain copies from elsewhere, and further, that another entity, different from record submitter 301, may be asserting a date for document 303. Also in the illustrated embodiment, challenger 501 provides a copy of media 324 to TI 401, although it should be understood that TI 401 may obtain a copy from elsewhere and that, in some situations, challenger 501 may perform some or all of the functions of TI 401, for example if challenger 501 can be trusted to properly handle a copy of document 303 and perform the validation process correctly. Variations described for systems 300 and 400 may be similarly reflected in variations for embodiments of system 500.

If challenger 501 is the same entity as record submitter 318, then challenger 501 has possession of media 324 and, presumably, business records indicating when media 324 was received. In this situation, records maintained under the control of challenger 501 actually provide dispositive evidence regarding the claim being challenged, the asserted date and/or integrity of document 303. However obtained, TI 401 is illustrated as possessing copies of media 313, media 324, document 303, IVC, generator 304, and IVC generator 314. TI 401 identifies record 305a in first DDL edition 312, which is on media 313, and record 315a in second DDL edition 323, which is on media 324.

TI 401 independently generates an IVC 505 from the copy of document 303, using the copy of IVC generator 304, which was originally used to produce IVC 305, and an IVC 515 from the copy of first DDL edition 312, using the copy of IVC generator 314, which was originally used to produce IVC 315. TI 401 compares the provided copy of IVC 305 with independently generated IVC 505 using comparison processor 506, and the provided copy of IVC 315 with independently generated IVC 515 using comparison processor 516. Comparison processors 506 and 516 may be similar to comparison processor 406. Upon a match from comparison processor 506, TI 401 issues validation certificate 507, and provides it to challenger 501. Upon a match from comparison processor 516, TI 401 issues validation certificate 517, and provides it to challenger 501. In some situations, one or more of validation certificates 507 and 517 may be provided to a different entity. Validation certificates 507 and 517 validate that an independently generated IVC matches an IVC which had been provided for comparison. Proof of an asserted date for document 303 can be found using either of timestamps 306 and 316, if issued by a TTSA, or using the business records of the sources of media 313 and/or media 324.

If challenger 501 does not possess a copy of media 324 containing second DDL edition 323, or does not trust a copy available from another entity, but instead possesses or trusts only a later DDL edition, the process described for system 500 can be iterated from the earliest DDL edition, which challenger 501 does trust, going backwards through copies of the intermediate DDL editions until first DDL edition 312 is reached. If TSA 302, or another entity, retains archived copies of the various IVC generators used for the DDL records, TI 401 will be able to reproduce all intermediate stage IVCs. This task may be is eased if each DDL record indicates the specific IVC generator and software version used. At the worst case, challenger 501 will need to admit that IVC 305 had been generated prior to the first DDL edition trusted by challenger 501, by at least the amount of time needed to compile each of the intermediate DDL editions.

FIG. 6 illustrates a system 600 for proving an asserted date for document 303, by proving a date that first DDL edition 312 existed through public record 317. In the illustration of system 600, TI 401 is used to counter challenges to the claims of record submitter 301 by a document challenger 601, regarding the prior existence and integrity of document 303. In the illustrated embodiment, record submitter 301 provides TI 401 with copies of media 313 and document 303. Also in the illustrated embodiment, challenger 601 provides a copy of public record 317 to TI 401, although it should be understood that TI 401 may obtain a copy from elsewhere and that, in some situations, challenger 601 may perform some or all of the functions of TI 401. Variations described for systems 300, 400, and 500 may be similarly reflected in variations for embodiments of system 600, including chaining multiple DDL editions from first DDL edition 312 up through a public record 317 acknowledged by challenger 601 to be trustworthy.

TI 401 independently generates an IVC 605 from the copy of document 303, using a copy of IVC generator 304, which was originally used to produce IVC 305, and an IVC 615 from a copy of first DDL edition 312, using a copy of IVC generator 314, which was originally used to produce IVC 315. TI 401 compares the provided copy of IVC 305 with independently generated IVC 605 using comparison processor 606, and the provided copy of IVC 315 from public record 317 with independently generated IVC 615 using comparison processor 616. Comparison processors 606 and 616 may be similar to comparison processor 406. Upon a match from comparison processor 606, TI 401 issues validation certificate 607, and provides it to challenger 601. Upon a match from comparison processor 616, TI 401 issues validation certificate 617, and provides it to challenger 501. In some situations, one or more of validation certificates 607 and 617, which validate that an independently generated IVC matches an IVC which had been provided for comparison, may be provided to a different entity. Proof of an asserted date for document 303 can be found using either of timestamps 306 and 316, if issued by a TTSA, the business records of the source of media 313, and/or using public record 317.

Figure 7:
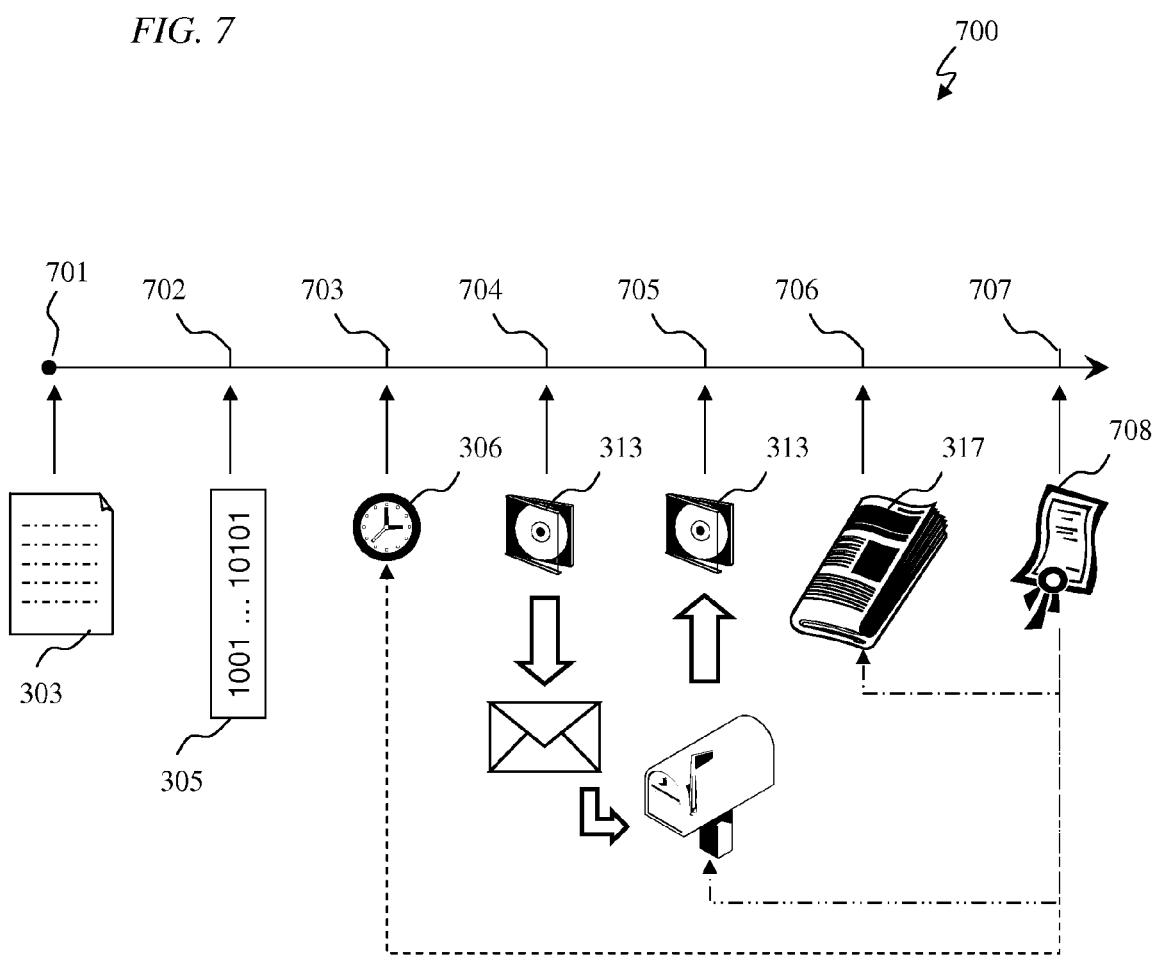
FIG. 7 illustrates a timeline for proving an asserted date for a DDL record generated in accordance with the illustrated system of FIG. 3, and compatible with FIGS. 4-6.

FIG. 7 illustrates a timeline 700 for proving an asserted date for document 303, as performed using one or more of systems 400, 500, and 600, shown in FIGS. 4-6, respectively. At time 701, document 303 s created, and it is processed to generate IVC 305 at time 702. Timestamp 306 is generated at time 703, when TSA 302 receives a copy of IVC 305. After first DDL edition 312 is closed to new record entries, media 313 is written at time 704 and is publicly distributed. Media 313 arrives at a destination outside the control of both record submitter 301 and TSA 302 at time 705. At time 706, IVC 315, representing first DDL edition 312 appears in public record 317, in a public forum. It should be understood that 706 may precede 705, based on mail transit times, pubic record publishing delays, and when each publicizing activity was initiated. Certificate 708, which can represent one or more of 407, 507, 517, 607, 617, or another relevant certification, is accomplished at time 707. The worst-case date proven is one of dates 705 or 706, depending on the source of the date records used, or the equivalent date for a later DDL edition, if the challenger refuses to accept the asserted date for first DDL edition 312. Timestamp date 703 is only inferred if the TSA is not trusted, although if a TTSA is used, and timestamp 306 is in a proper certifying form, such as accompanied by a copy encrypted with the TTSA's private key, the credibility of the TTSA can be used to prove timestamp date 703.

Thus, systems 300, 400, 500 and 600 allow for establishing an asserted document date and integrity when using a timestamping authority that is not trusted by a challenger. Relaxing the provable date from timestamp date 703 to one of independent possession date 705, provable public disclosure date 706, and the data of a later DDL edition, along with leveraging the records of disinterested parties, enables embodiments of system 300, 400, 500 and 600 to function without the security vulnerabilities and many of the other risks inherent in the prior art systems.

In many situations, the relaxed date will suffice. That is, in many situations, it is not required to prove the exact date that a document was timestamped, but rather it is enough to prove that a document exceeds some lesser age. For example, when using a DDL to date a document used in a PTO office action rejection of a pending application, is may not be necessary to prove that a specific document is 15 years old versus 14 years old, but rather that the document existed at any time prior to the application priority date, which may be considerably more recent. This relaxing of requirements enables the system to operate more robustly and with reduced need for trust.

Figure 8:
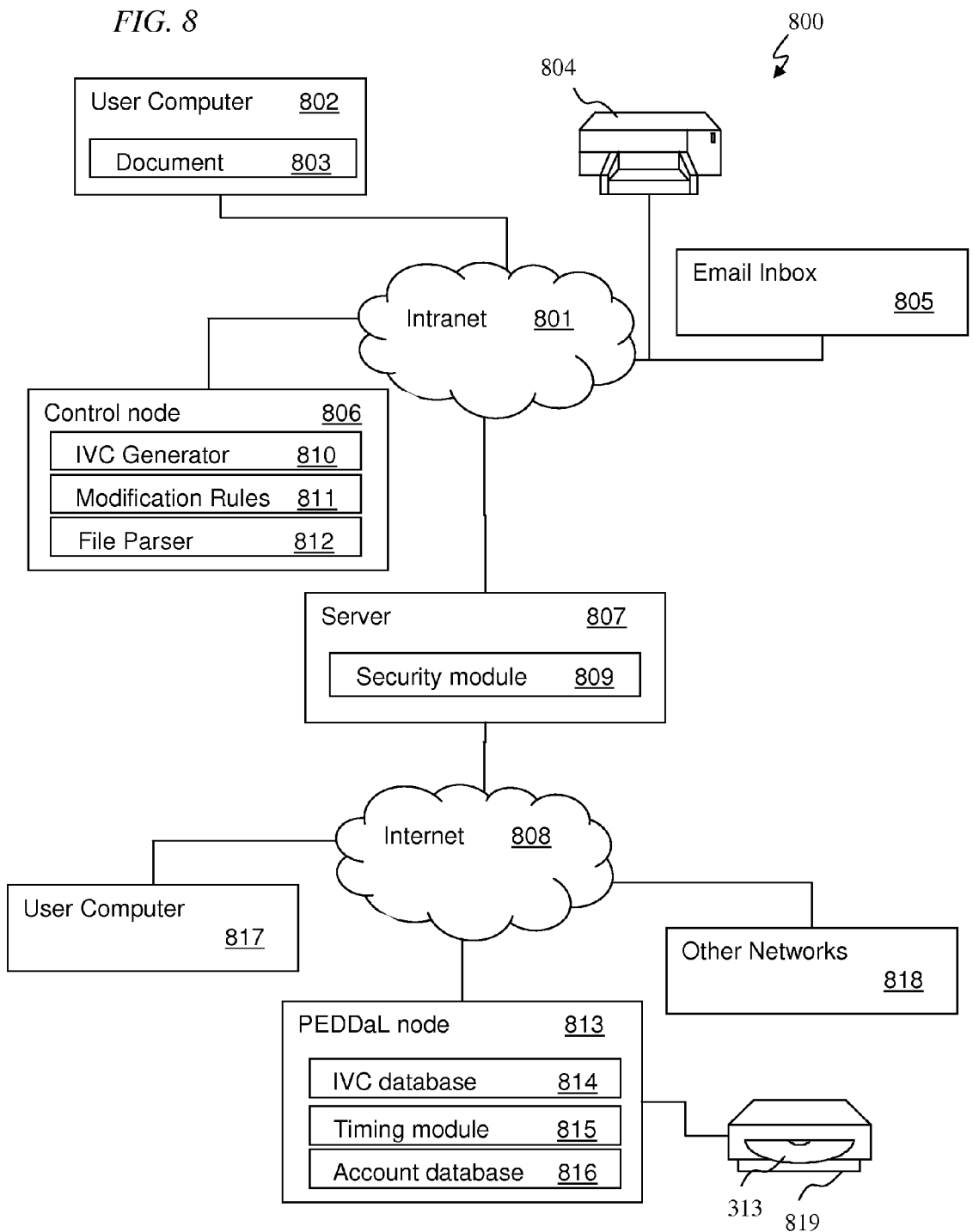
FIG. 8 illustrates an embodiment of an automated system for generating an integrity verification code (IVC) for submission to a DDL.

FIG. 8 illustrates an embodiment of an automated system 800 for generating an IVC for submission to a DDL. The illustrated system is described for operation with printable documents, such as word processing documents, portable document format (PDF) documents, and other files are suitable to be emailed and/or stored on a computer. Although reference is made to generating an IVC using modification rules applied to at least a portion of the document, it should be understood than embodiments of automated systems, configured to automate record submissions to a DDL, may generate IVCs using other methods and traditional methods such as common hash functions.

Illustrated system 800 comprises an intranet 801, although other computer networks may be used. A user computer 802 is used to create document 803, and is coupled to intranet 801, and may be a digital version of one or more of documents 303, 308 and 319. Also coupled to intranet 801 are a network printer 804, an email inbox 805, a control node 806, and a server 807, acting as a gateway to internet 808 with security module 809 as the gatekeeper. Control node 806 is configured to intercept document 803 as it is sent from user computer 802 to printer 804, email inbox 805, control node 806 itself or an outside email address across internet 811. Printer 804 may be used to print one or more of documents 303, 308 and 319 and may further comprise a document scanning function for rendering images suitable for an OCR process.

Control node 806 comprises an IVC generator 810, a modification rule module 811, and a file parser 812. File parser 812 identifies the type of document 803, generates at least one original data sequence, selects a type-specific modification rule set from modification rule module 811, and calls IVC generator 810 to produce an IVC. IN some embodiments, IVC generator 810 excludes elements from the IVC calculation that are not printably determinable from a printed copy of document 803. It should be understood, however, that alternative configurations of control node 806 can perform the same required functions. Control node 806 illustrates an embodiment of a PaVePaD™ system described in U.S. patent application Ser. No. 12/053,560, "DOCUMENT INTEGRITY VERIFICATION".

Upon generation of the IVC, control node 806 communicates the IVC to an embodiment of a PEDDaL™ system running a DDL node 813. DDL node 813 hosts an IVC database 814, a timing module 815, and an account database 816. DDL node 813 is coupled to a media writer 819, capable of writing at least a portion of IVC database 814 to media 313 and/or media 324. IVC database 814 comprises DDL editions, for example first DDL edition 312, second DDL edition 323 and/or other editions. IVC database 814 enables the author of document 803 to prove the existence of document 803 as of the date that a DDL edition of IVC database 814 became public. In some cases, for example if DDL editions are released daily or more often, this may be the same date that document 803 is created. The process for creating a database record for document 803 is automated, and occurs when document 803 is sent to printer 804, email inbox 805, or any other destination monitored by control node 806, provided the. However, IVC database 814 does not betray the contents of document 803 to the public, because IVC generator 810 is a one-way function. It should be noted that, while the illustrated embodiment shows the use of IVCs generated in accordance with modification rules module 811, some embodiments of IVC database 814 can store prior art hash values.

Using database 814 is then easy for a user, due to the automated operation of the illustrated system. A registered user merely sends document 803 to a printer or email inbox, such as printer 804 and email inbox 805, which has been designated as a recipient node for triggering a database entry by an administrator of intranet 801, or places the document in a certain directory accessible by control node 806, and the record generation is automated. For example, a large company may set up a designated printer 804 in an engineering department, and instruct employees to print certain technical reports to printer 804 or use a certain facsimile machine for ingoing and/or outgoing fax messages that are to be processed. For a fax, the fax bit stream is used to generate the IVC, but may need to be stored in an archive. As an another example, a law firm may instruct its support staff to email copies of PDF documents filed with the US PTO to a designated email inbox 805, so that if a document date is later contested, an independent database can at least verify the document's existence as of a certain date. As another example, a company may instruct its employees to place important documents in a specially titled folder on their computer or else in a directory on a network node. In some embodiments, control node 806 can further determine that a received document is sent from a previously identified computer outside security module 809 of server 807, such as computer 817, when an authorized user is logged into intranet 801 from a remote location. However, control node 806 may further avoid processing print jobs or documents sent to printer 804, email inbox 805, or a designated folder by unauthorized parties, in order to avoid triggering undesired IVC generation and database entry costs.

In operation, an exemplary system may function as follows: Upon a user sending document 803 to a monitored destination, control node 806 sends a message with account identification (ID) to DDL node 813. DDL node 813 compares the retrieves time information from timing module 815, and using the account ID, identifies the responsible entity in account database 816. Other networks 818 can comprise another control node, which automatically interacts with DDL node 813, similarly as control node 806. Account database 816 enables identification of the responsible party to bill for database usage. DDL node 813 can operate on either a per-use or a capacity subscription basis, similar to the way a communication service permits a user to contract for a given number of messages on a monthly basis, and charges for extra messages above that number.

If DDL node 813 determines that a requested database entry is from an authorized database user account, it retrieves time information from timing module 815. DDL node 813 then sends the time information, and optionally, a security code to use when submitting a database entry. Control node 806 timestamps the generated IVC using the time information received from the database node or optionally, it's own internal clock, and returns the IVC, along with an optional time stamp and response security code. DDL node 813 timestamps the incoming information, using information from timing module 815, and updates IVC database 814 with the received IVC and at least one timestamp. Submitter ID information may optionally be added to IVC database 814. DDL node 813 then sends an acknowledgement of the IVC addition, so that control node 806 does not need to resend the information after a time-out. DDL node 813 and control node 806 exchange fee information, and DDL node 813 updates account database 816 to increment the number of IVC submissions from the account holder associated with control node 806. As some point, the owner of control node 816 is billed for the database services. Upon some event, perhaps IVC database 814 reaching a certain size, or the lapse of a predetermined amount of time, a permanent computer readable medium, such an optical media, containing a copy of IVC database 814, is sent to at least some of multiple contributors to IVC database. Additional copies may be sent to other data archival service providers and libraries. Older versions of IVC database 814 may remain available over internet 808 for searching purposes.

At a later time, the author of document 803 may be accused of trade secret theft, and may wish to use document 803 to prove prior conception of an invention to the accuser. Consider, for the following example, the convenient case that both the author of document 803 and the accuser submitted IVCs to the same version of IVC database 814, and that the accuser kept accurate date records of the receipt of the media. Accuser then has possession a copy of the portion of the IVC database 814, which can be used to prove that document 803 existed, at the latest, as of the time that the accuser received the media. The author may provide a printed paper copy of document 803, or a copy in another format, to the accuser, along with an assertion of the date at which document 803 was allegedly created, and instructions on where to find the IVC in the accuser's own copy of the old IVC database. The accuser can then independently generate the IVC, even from a paper copy of document 803 and verify that it matches a record in IVC database 814. Upon this occurrence, the accuser must then admit to the existence of document 803 prior to the date that the accuser's own internal records indicate receipt of the media containing IVC database 814. Other options exist when the convenient case described above does not exist, such as a third party performing the verification, using a copy of the proper edition of the IVC database 814 from a trusted archival source. This option allows the verification of the date of an important document, even without disclosing the contents outside trusted parties, and can thus provide an efficient, reliable alternative to many IP litigation procedures. Thus, a large organization can automatically, and cost-effectively, provide for date-proving documents generated by its employees.

An embodiment of an automated IVC generation system receives a file, generates an IVC, and communicates the IVC to a DDL. The system may further communicate account ID information to the DDL. The system may further communicate a security code to the DDL. The system may further communicate with the DDL node to obtain an IVC generation module, and communicate to the DDL indicia of the IVC generation module and options used. The system may further generate a second IVC with different IVC generation conditions, such as using different rules or a different algorithm. The system may further generate an IVC according to modification rules, and may further parse the file, based on the file type. The system may further resend information if an acknowledgment from the DDL node is not received within a time-out period. The system may further timestamp information prior to sending it to the DDL node. The system may further request a time reference from the DDL node prior to generating the timestamp. The system may further generate one record for submission to the DDL node, which represents a plurality of files. Receiving a file may comprise intercepting a file sent to a destination, such as a printer or email inbox. Receiving a file may comprise scanning an identified directory at a selected time. Scanning the identified directory may comprise scanning the identified directory to identify files added since a prior scan. Receiving a file may comprise intercepting a facsimile associated with a particular fax machine, either incoming or outgoing. Receiving a file may comprise intercepting a copy of a website page being moves to a web server.

Figure 9:
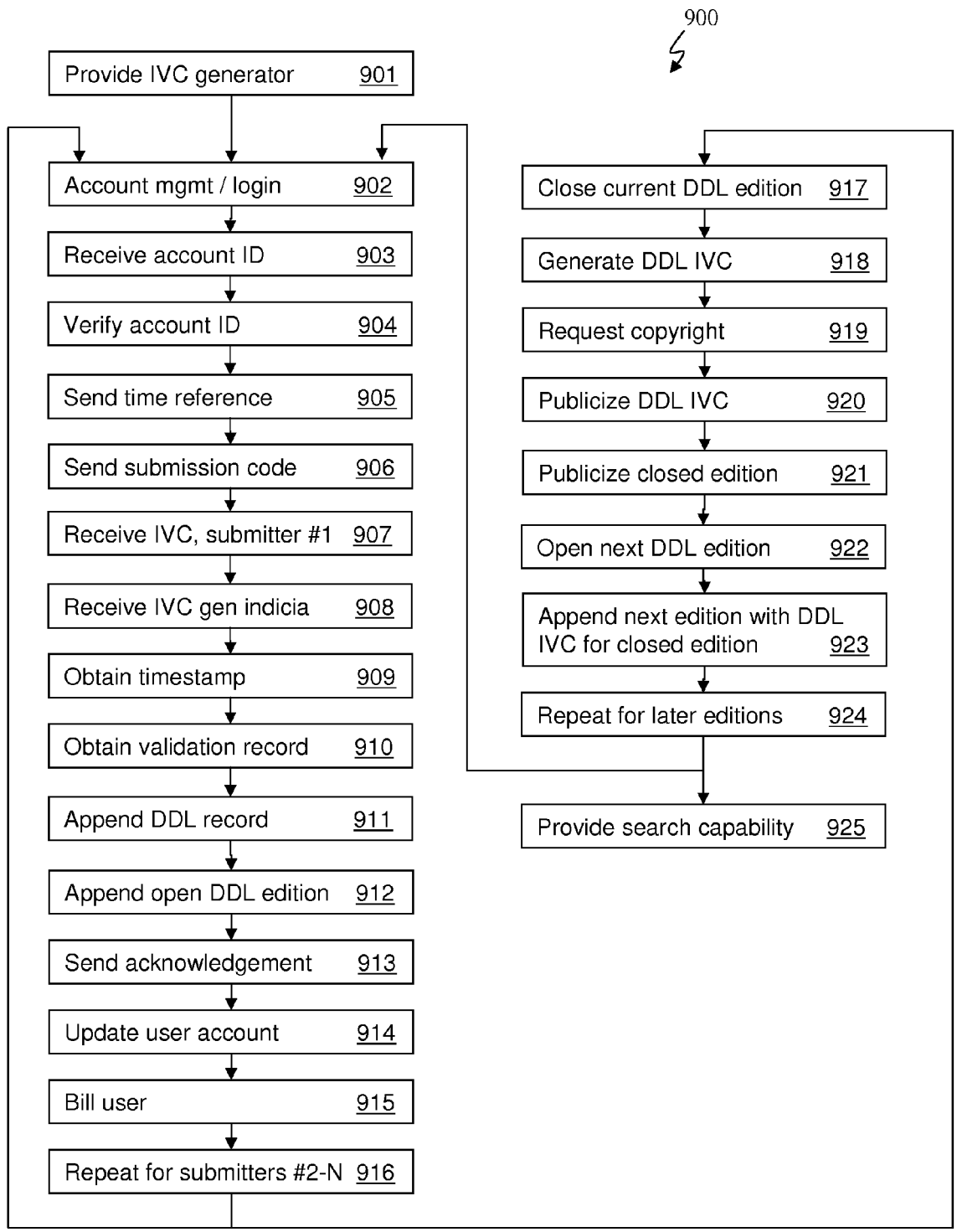
FIG. 9 illustrates a method of managing a DDL.

FIG. 9 illustrates a method 900 of managing a DDL. To operate a DDL service, a DDL services provider performs at least some of the following processes, although some may be omitted or modified in certain embodiments:

In box 901, copies of IVC generation software and/or hardware, which will produce a compatible DDL record having a predetermined format, are provided to potential DDL submitters. In some situations, this may involve placing downloadable copies of software on a website, providing links to other websites having compatible software, or suggestions on how to obtain or develop an IVC generator. In box 902, an account management and/or login screen is provided and may support a one-time fee for one-time service transaction, a subscription account, or both. An account set-up and management system to allow users to conduct transactions with a DDL service provider, including performing at least some of submitting IVC records, requesting copies of a DDL edition, submitting payment, and assigning any copyright interest in submitted DDL records. In some embodiments, at least some user accounts may be managed to enable anonymous submissions. In box 903, an account ID is received, which is verified against an account database in box 904, to check for a valid and open account, current on any billings.

Some IVC generators may provide a submitter-generated timestamp, which may or may not be included in the published DDL edition. A submitter-generated timestamp may have less value than one produced by a DDL service provider, since a submitter could intentionally attempt to submit a falsified timestamp. However, if an IVC generator does provide its own timestamp, it may request a timekeeping reference from the DDL service provider, to synchronize its own clock with an external, presumably trusted, system. Thus, in box 905, a time reference is sent to a potential submitter.

Additionally, for some subscription services, submitter-side computing resources may perform some initial handshaking and synchronization with DDL service computing resources prior to submitting an IVC or a batch of IVCs. Scenarios include a periodic archiving service, for example a weekly storage media backup for a computer, which additionally scans selected directories, identifies new files, generates IVCs for them, and then submits the IVCs to a DDL. Such a system could operate automatically on a subscription basis, in order to reduce the workload on information technology (IT) managers who administer the computer network.

In an example operation, submitter resources associated with a valid, open subscription account contact the DDL resources with identifying information, signal the start of an IVC submission process, and request synchronization. The DDL resources verify that the account ID corresponds to a valid account with permission to perform the requested operation, and then send both a time reference and, as indicated in box 906, a submission code. If the user account lacks the permissions, a security code will not be sent. Then, if an IVC submission follows, using a communication protocol associated with a security code, but which is not accompanied with a valid code, the submission will be rejected. In some embodiments, the submitter-side computing resources processes security code information to produce a response code, rather than merely repeating the received information back to the DDL service computing resources. The processing may include an encryption process.

In box 907, an IVC is received from a first submitter. The IVC may comprise portions or the entireties of message digests from a plurality of hash functions, or just a singe hash function. In box 908, IVC generation indicia are received, including identification of the IVC generator or generators used, software version, a submitter-asserted timestamp, and other information that may be relevant to enabling a later reproduction of the submitted IVC. Together with the processes of prior boxes, a submitter has, by this point, submitted at least a portion the information necessary to generate a DDL record. In some embodiments, the submission may be in proper format for appending to an open DDL edition, with only the addition of information by the DDL service provider. In some embodiments, the DDL service provider will need to reformat submitted information, for example in box 911, which will be described in more detail later. A timestamp is obtained in box 909, either generated locally, or requested from an external source. In some embodiments, box 909 may involve obtaining a trusted timestamp in accordance with prior art system 100, illustrated in FIG. 1. In box 910, a timestamp validation record is obtained, possibly similar to encrypted hash value 111 of system 100. If the DDL services provider acts as a TTSA, the validation record may be generated by the DDL service computing resources.

A record compatible with an open DDL edition is appended in box 911 with the timestamp information, and may require reformatting if a submitter did not format the information in accordance with a desired record format. Although a DDL services provider may experience a lighter computational burden if submitters use standardized software, some submitters may use third party software, and/or software which create records in an obsolete format. A DDL services provider will likely have an interest in ensuring that properly functional submitter software is available, and includes bug fixes and updates. The DDL record is appended to an open DDL edition in box 912. Some embodiments will include a count or index number in the DDL record, which can be added in one of boxes 911 and 912.

In order to prevent a submitter from unnecessarily repeating the submission process, an acknowledgement is sent in box 913. For a user-interactive submission session, this may be as simple as generating a window for an internet browser, such as a completion web page or a pop-up window. Automated submission systems may attempt to resubmit information after a time-out period or a failure message, so an acknowledgement will prevent release of the computing resources. Some embodiments of an acknowledgment message will include an identification of the open DDL edition containing the submitted record, along with a record index number, or numbers, if there is a plurality. Providing this information to a submitter will enable the submitter to readily locate the IVCs at a later date, for example when attempting to prove an asserted date. The expected closure and/or publication dates and times for the DDL edition may also be provided in an acknowledgement message, or at a later time.

In box 914 the user account is updated, possibly with a count of the number of IVCs submitted, and/or a reference of the record index number and DDL edition, if such information will be desired later. Keeping such information could potentially work against anonymity efforts, although if a submitter loses its own copy of index and edition information, information retained by a DDL services provider may ease the burden of searching for the submitter's IVCs at a later time. The user is billed in box 915. The billing may be based on the number of submissions, or may reflect a subscription service permitting a certain number of submissions during a time interval, with an extra charge for a number above the allotted amount.

In box 916, another submitter begins interfacing with the DDL system, and boxes 902-915 are repeated for each of the other submitters while the current DDL edition is open. It should be understood that multiple submitters may be in various stages of the submission process simultaneously, so that the processes thus described may be implemented in parallel. It should be further understood that some of the stages may be changed in order and/or blended, based on specific implementation needs, capabilities, and business operations of a DDL services provider.

The current DDL edition is closed to new entries in box 917, and an IVC is generated for it in box 918. A DDL record is generated, possibly including timestamp information, so that multiple DDL editions can be chained. In box 919, a copyright registration may be requested on the recently closed DDL edition. The DDL IVC, and possibly other portions of the record that may appear in a subsequent DDL edition, are publicized in box 920. This may include printing an announcement in a newspaper, pacing the information on a website, or other attempts at publicity. The closed edition is publicized in box 921, for example by writing and mailing media, emailing copies, if not prohibitively large, and placing on a publicly-available internet website. The internet website suitable for DDL searches may require a user login, and have some access requirements that limit the portion of the public able to access it. Also as part of box 921, an electronic message may be sent to submitters to inform them that the DDL edition has been publicized, and providing them with information to enable identification of the edition containing their submitted records.

The next DDL edition is opened in box 922, although it should be understood that multiple DDL editions may be open contemporaneously to improve system response times, based, in part, on the rate at which submissions are received or expected. The now-open DDL edition is appended with the DDL IVC generated for the recently closed DDL edition in box 923. The DDL IVC may be the first record, although if the current DDL edition was opened and receiving records while the recently closed DDL edition was being processes, the DDL IVC might not be the first record. As indicated in box 924, portions of the previously-described process are iterated for multiple DDL editions, which are closed according to criteria that are selected by the DDL services provider, and may include the elapse of a predetermined amount of time, or the size of a DDL edition. Iterative chaining allows for a cumulative record of IVCs, continuously protecting all prior submissions indefinitely, and a DDL IVC may be written to multiple subsequent editions. In box 925, a search capability is provided, for example for internet browser dating modules, interactive searches, linked document archives, and search engines. The DDL services provider may charge a fee for searching.

Many of the processes can be performed by a DDL control module, implemented in hardware, software embodied on a computer readable medium, or both. Examples include interacting with a submitter's computing resources, interacting with a timing module and/or a TTSA's computing resources, appending a DDL edition, writing to media, account management, and publishing information on a website. A hardware apparatus may comprise an application specific integrated circuit (ASIC) and/or a field programmable gate array (FPGA). A hardware apparatus may comprise one or more general purpose central processing units (CPUs), coupled to memory holding software programs capable of executing at least some of the processes. Some of the process may not be used for a one-time fee for one-time service business model, and some of the process may not be used for a subscription service business model. Operating a DDL service may comprise offering users a choice between a one-time fee for one-time service and a subscription service transaction, so that both business models are contemporaneously available, and utilized based on customer preferences.

In some embodiments, a DDL record submission is anonymous, such that even a DDL administrator is unable to identify the submitter. In some embodiments, a DDL record submission is associated with a specific user account or other identification information. In some embodiments, both anonymous and user-identifiable submissions are accepted. Both identifiable and anonymous submissions may be available with multiple transaction types, in order to more fully accommodate customer preferences. For anonymous records, the billing process may require additional steps to ensure anonymity, such as purging records after payment is received, and/or using an intermediary billing service, along with an account ID that lacks real names or other information that could specify the submitter's true identity. For some DDL customers, though, anonymity may not be necessary, and a simpler account management system may be preferable.

Anonymity may take various forms. For example, the submission process may be anonymous as previously described. Additionally, the publication process may be anonymous, even if the submission process is not. That is, even if a DDL administrator could link a record submission to a particular submitter identity, some embodiments of a published DDL edition will not include any of the identifying information. However, in some situations, the submitter may wish to associate an identity or a document title with a DDL record in a published database. Some embodiments of a DDL edition may make accommodations for this customer preference, either in the DDL itself, or in an appendix to the DDL edition, providing identifying information, whether submitter, document title or both.

If a published DDL record is anonymous, using a DDL system to protect IP operates with a unique paradigm: Users pay their own money in order to include information anonymously in a publicly distributed record.

An embodiment of a DDL services receives at least one IVC from each of a plurality of submitters and appends a DDL edition. The system may associate a timestamp with one or more of the IVCs. The system may further communicate a security code to a submitter. The system may further provide an IVC generation module. The system may further generate and send an acknowledgment to a submitter. The system may further request a timestamp from an external system. The system may further publicize the DDL edition. The system may further generate an IVC representing the DDL edition. The system may further publicize the DDL IVC. The system may further include the DDL IVC in a second DDL edition. The system may further iterate for multiple DDL editions, thereby generating a plurality of chained DDL editions.

Figure 10:
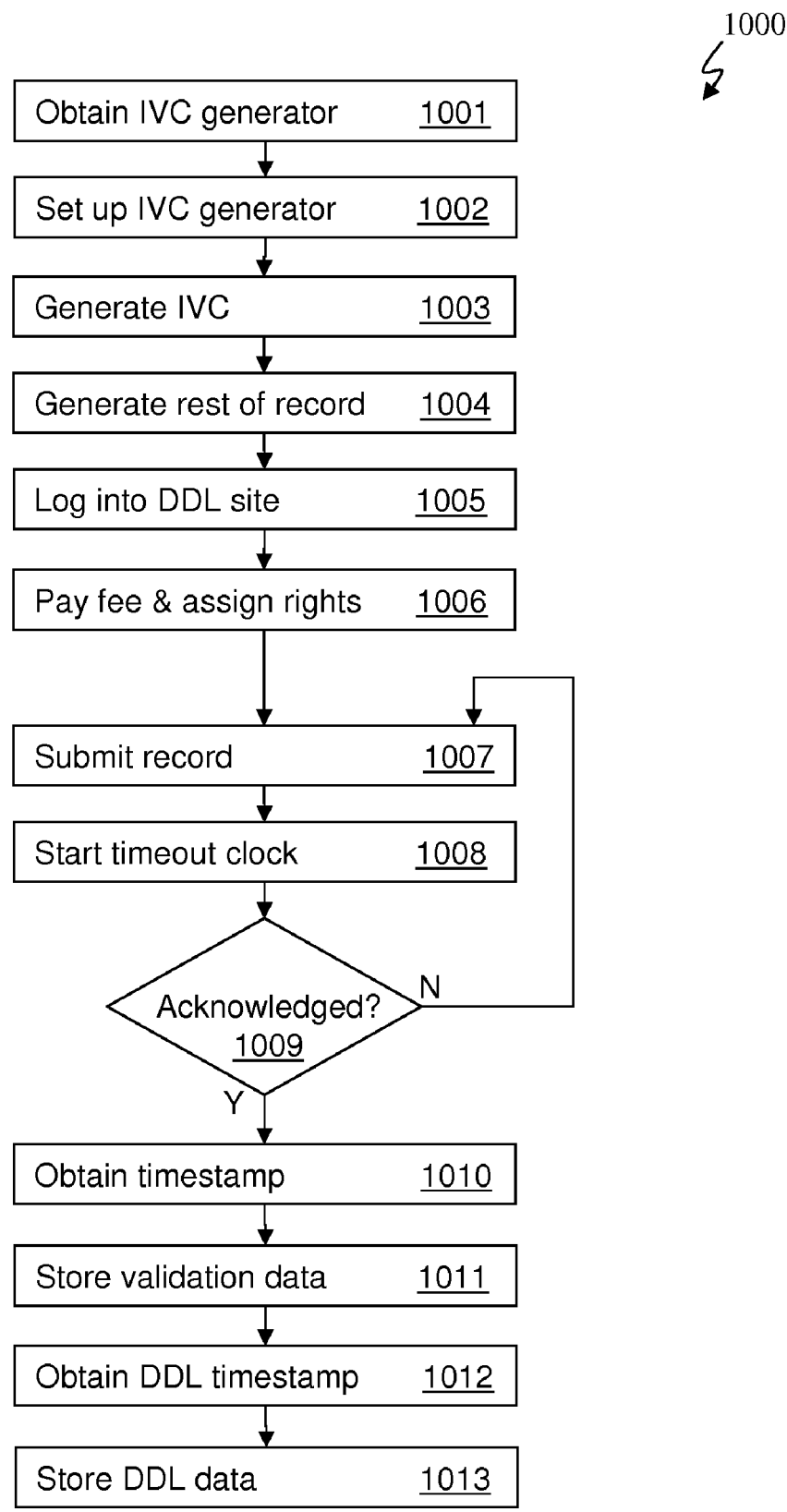
FIG. 10 illustrates a method of submitting an entry to a DDL representing a single file.

FIG. 10 illustrates a method 1000 of submitting an entry to a DDL representing a single file. Method 1000 is illustrated using a one-time fee for one-time service business model, initiated upon user action. It should be understood, however, that a user may initiate a DDL record submission using a subscription business model. It should also be understood that a user may submit a single DDL record representing a collection of files, for example the entire contents of a CD or DVD. It should also be understood that a user may submit a plurality of DDL records representing a plurality of files. Variations in method 1000 are possible without departing from the scope of the invention, and may reflect improved operational efficiency, provider capabilities, and/or user preferences.

In box 1001, a user obtains an IVC generator. Possibilities include visiting the website of a DDL services provider and downloading software, either provided free or for a nominal cost. Other possibilities include developing an IVC generator independently, so that it produces a record compatible with an intended DDL submission. The IVC generator is set up in box 1002, for example by installing it on a user computer system, and may include configuring the IVC generator to send in a security code uniquely associated with the user's account. Some embodiments of an IVC generator may be set up to automate at least some of the processes described in boxes 1003-1013. At least one IVC, possibly a plurality of IVCs, is generated to represent a selected file, in box 1003. In some embodiments, this is a user-interactive process, such as a user identifying the file using a graphical user interface (GUI), however, in some embodiments, a file may be selected based on it's directory location. In some embodiments, the IVC generator runs automatically at certain times. In box 1004, the remainder of a record for submitting to a DDL is generated, to the point of completion expected by the DDL services provider. This may include providing an account ID and a user-asserted timestamp, which may further include synchronizing with a time reference from the DDL services provider sent in accordance with box 905 of method 900.

In box 1005, the user logs into the DDL website, possibly using a previously established user account and, in some embodiments, sending a security code to assist with validating the user's identity. As part of the log-in process, the suitability of the IVC generator may be examined, and if it is out of date, the user may be prompted to download a new version and reset to box 1001. In box 1006, the user pays a fee to use the DDL services, provides permission to publish the user's records in a DDL edition, which may include an express assignment of any copyrights in the generated record, and selects whether to receive a copy of the DDL edition. The user may perform fewer or additional interactions with the DDL services provider, based on the business models available. During set-up of the IVC generator, the user may enter a credit card number, which can be billed upon submission of the IVC. Alternatively, or additionally, the user may enter the credit card number into a payment processing page of the DDL website, or else use another form of internet-based payment. The record generated by the user is submitter in box 1007, and is subject to modification by the DDL services provider.

A timeout clock is started in box 1008, and if an acknowledgement of a successful submission is not received in time, as indicated by decision box 1009, the record is resubmitted in box 1007. In box 1010, a timestamp is received, possibly as part of the submission acknowledgment, and may be the timestamp of the record reception and/or an expected timestamp for the DDL edition close-out and publication. In box 1011, a copy of data sent in accordance with box 913 of method 900 is saved. This may include information usable to rapidly locate the IVC in the DDL, including an identification of the DDL edition and/or a record index. When the current DDL edition is closed and published, if the DDL services provider sends an announcement to submitters regarding the closing and publication of the DDL edition, this information is received in box 1012, possibly by responding to an email and downloading the information from a website, although other methods of obtaining the information may be used. This information is stored in box 1013. Information stored during performance of the processes associated with boxes 1011 and 1013 may be stored in a central location and/or with the files for which IVCs were submitted. An embodiment of an IVC generation system receives a file, generates an IVC, communicates the IVC to a DDL, and stores information received from a DDL services provider.

Figure 11:
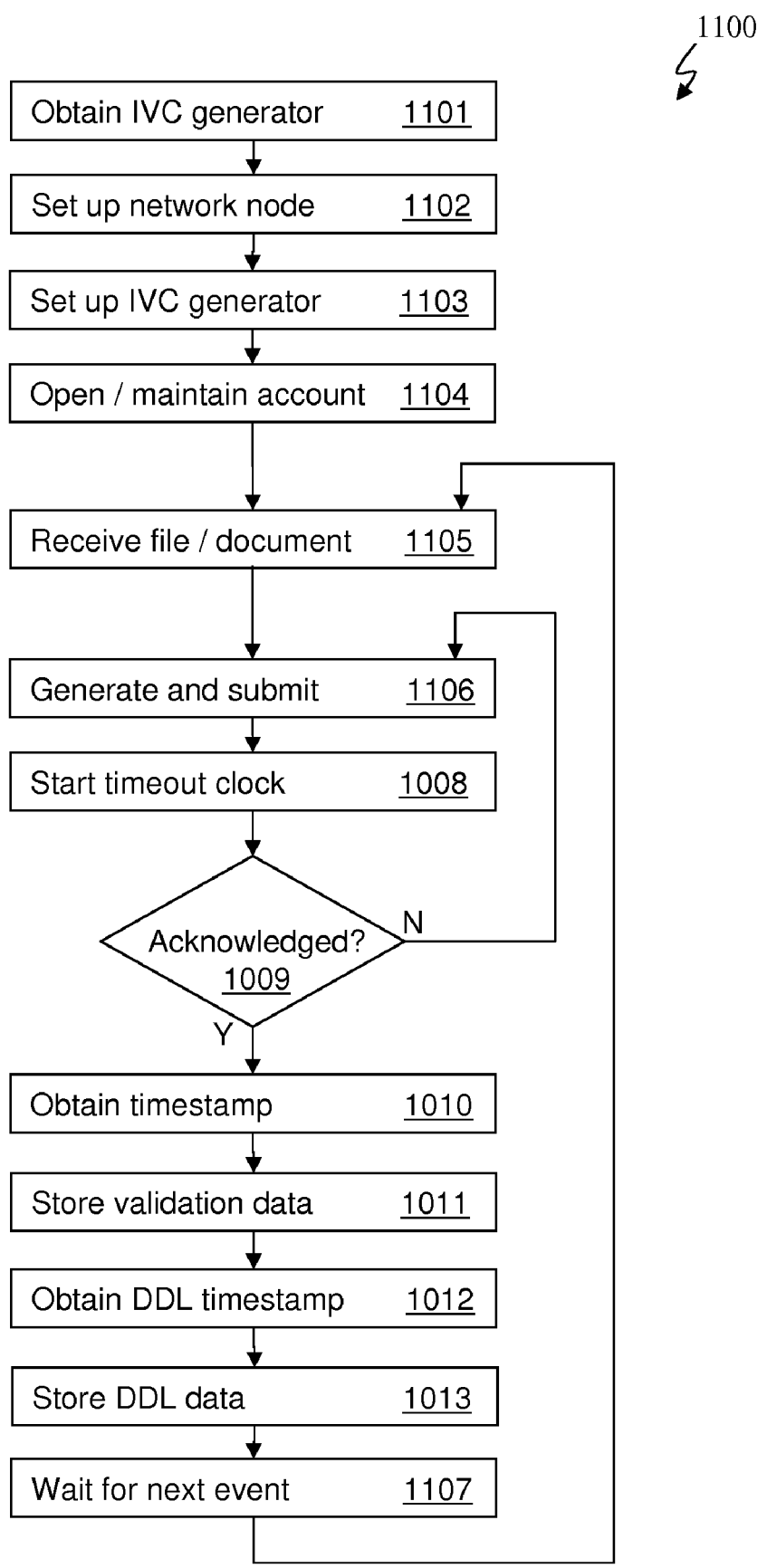
FIG. 11 illustrates another method of submitting an entry to a DDL representing a single file.

FIG. 11 illustrates a method 1100 of submitting an entry to a DDL representing a single file. Method 1100 is illustrated using a subscription business model for automated IVC generation. However, it should be understood that an automated submission may be conducted using a one-time fee for one-time service business model. It should also be understood that an automated system may submit a single DDL record representing a collection of files, for example a set of files received by a node during a defined time period. It should also be understood that a system may submit a plurality of DDL records representing a plurality of files during a single submission session. Variations in method 1100 are possible without departing from the scope of the invention, and may reflect improved operational efficiency, provider capabilities, and/or user preferences. It should be noted that variations and/or clarifications for any of the methods described herein may carry over to other methods without departing from the scope of the invention.

In box 1101, a user, for example an IT administrator, obtains an automated IVC generator, and sets up a network node or a plurality of nodes, accessible to authorized authors, in box 1102. Possibilities include designating a particular printer, email inbox, facsimile machine, incoming and/or outgoing, network directory, and/or other computing resources. Access may be limited to computers connected to a particular network node behind a security module and/or capable of logging into a network with certain account privileges. The IVC generator is set up in box 1003, for example by installing it on a particular node capable of intercepting network traffic going to the designated network nodes and/or identifying authorized submitters. In box 1005, the user sets up and/or updates a subscription account. Setting up the account may include setting up a payment system, selecting a rate plan that specifies a rate at which records are expected to be submitted along with overage charges, providing a blanket assignment of rights in the upcoming records, furnishing a mailing address for DDL media, requesting a security code, specifying anonymity options, and other actions suitable for maintaining an account suitable for DDL transactions.

In box 1105, a file is received. This may include receiving an attachment to an incoming email, scanning a directory, intercepting a bit stream sent to a printer, receiving an incoming facsimile bit stream, scanning a document in order to generate a PDF or outgoing facsimile with a designated network resource, and other actions in which the IVC generator obtains access to a file or bit stream under conditions specified for generating an IVC. A DDL record, at least the user-submitted version of a record, is generated and submitted to a DDL node, for example, DDL node 813, illustrated in FIG. 8. The submission may be accompanied by the security code, or another security code generated in order to validate that the submission is authorized by the user. Various security protocols for generating a secure, non-repudiated automated message are known in the art, and may be utilized in box 1106. Boxes 1008-1013 are as described with regard to FIG. 10.

In box 1107, the next trigger event returns method 1100 to box 1105. The trigger event may be one of a plurality of events, based on the network resources associated with the IVC generator. An embodiment of an automated IVC generation system receives a file, generates an IVC, communicates the IVC to a DDL, stores information received from a DDL services provider, and repeats upon a recurrence of a trigger event. A trigger event may be receiving an email, receiving a facsimile, scanning a document, scanning a directory upon predefined conditions, scanning a directory for files not previously processed, and intercepting a document sent to a printer.

Figure 12:
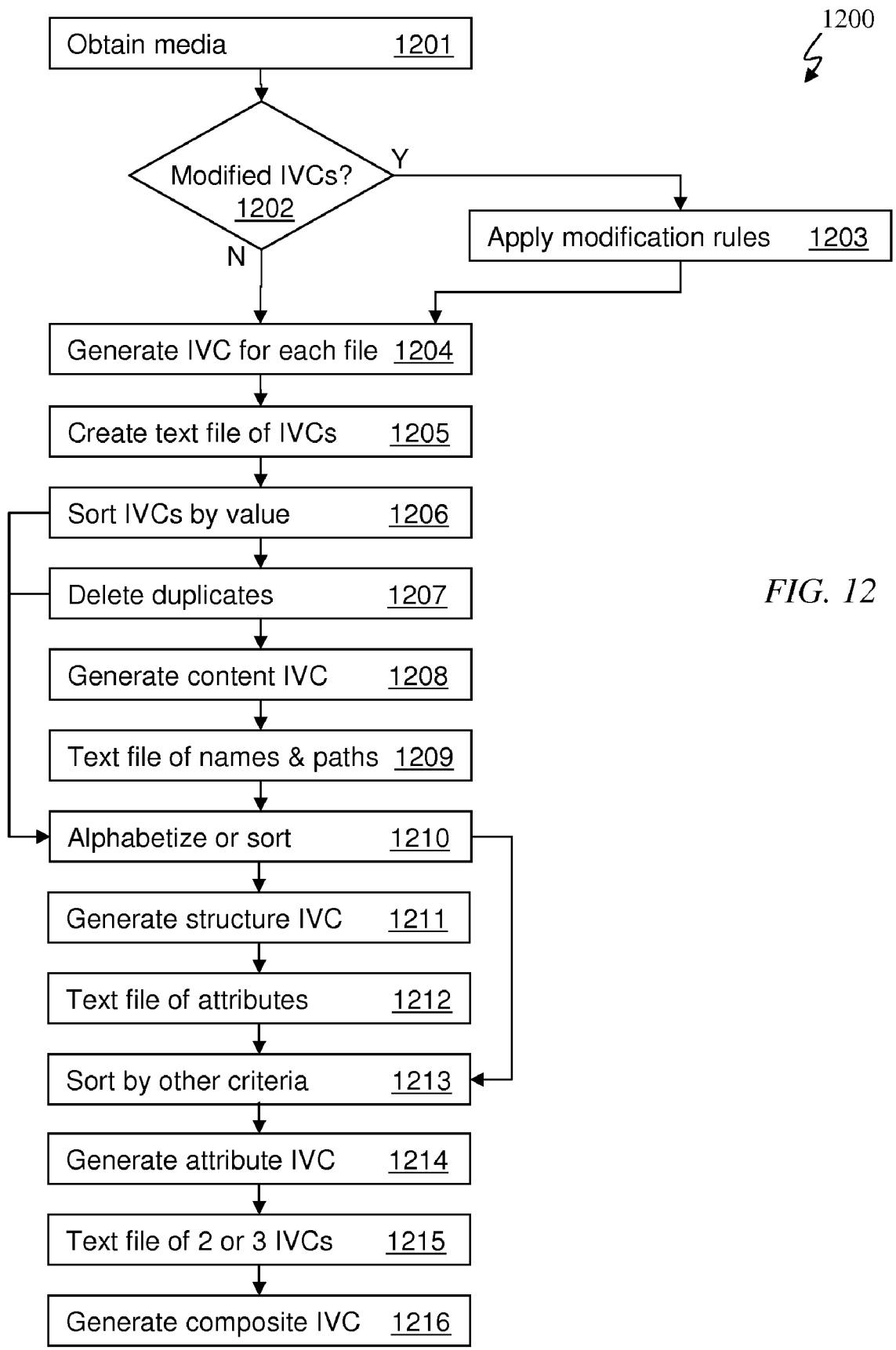
FIG. 12 illustrates a method of generating a single IVC representing the content of a plurality of files.

FIG. 12 illustrates a method 1200 of generating a single IVC representing the content of a plurality of files. Using method 1200, it is possible to obtain a single IVC representing an entire CD, DVD, or other collection of files, such as the files within a set of directories on a magnetic media. This precludes the need to submit an IVC for each of potentially hundreds or thousands or even more files individually, which could reduce DDL submission costs for a DDL user or subscriber, by reducing the number of DDL records submitted. Use of method 1200, in place of generating an IVC for each file individually, requires that all documents in the plurality are validated together as unit. This may not be desirable in many situations, since the collection of files that comprised the plurality must be disclosed to the entity performing the validation process.

In box 1201, media is obtained, which contains the files to be processed. The selection of generating IVCs on the entire file contents or else using modification rules is made in decision box 1202. If modifications are to be implemented, the rules are applied in box 1203, and method 1200 proceeds to generate IVCs for each of the files in box 1204. In box 1205, the sequence of IVCs is placed in a text file, which could be a simple ASCII file, although other storage formats may be used. Boxes 1204 and 1205 may overlap in time, based on the memory resources available. In box 1206, the IVCs are sorted by value. This precludes a potential problem that might otherwise arise, by permitting generation of an IVC representing only file content, but which is blind to directory structure.

Since the text file will reflect the order in which files are selected for processing, and this is likely done by a control function ordering the files according to directory structure, the text file will depend on the directory structure. Although sets of IVCs will be the same for differing directory structure, the ordering of the individual file IVCs within the text file will depend on the structure. Thus, without a sorting process or some equivalent process that sheds the influence of the directory structure, an IVC generated to represent only the content of files on a media will additionally include the order in which the files were processed. This may be undesirable in some situations.

For many purposes, the directory structure of a set of files is not critical. In some cases it is important, but such an importance will be addressed by boxes 1208-1201. Setting aside the importance of file structure in order to perform integrity verification of file content allows for the possibility that a file moved, entirely intact, from one directory to another. In such a situation, the information content, apart from location, is intact and unchanged. It should then be possible to identify that the content is intact. Sorting the file IVCs by value can enable reliable recreation of the same final output text stream at two different times, initial generation and later validation, even if the directory structure has changed between. In box 1207, duplicate IVCs are detected and deleted. In some situations, this process can enable an identification of space saving opportunities if the files are not on permanent media, since the duplication of files can be brought to a user's attention for possible deletion. If directory structure is important enough that there is no need for an IVC that is blind to directory structure, boxes 1206 and 1207 may be omitted.

The IVC representing the file content is generated in box 1208, possibly blind to directory structure as noted previously. An IVC representing directory structure is generated in boxes 1209-1211, to compensate for the potential loss of information in the content IVC. At a later date, the content IVC and a structure IVC can be verified separately, and if a file has been moved intact, from one directory to another, or else a file name has been changed while the content remained intact, the changes to directory structure can be noted without spoiling the verification of the content IVC. A list of file names, including paths carrying the directory structure, is created in box 1209. This list is either alphabetized, or else is modified in box 1210 to correspond with the sorting and deletion of the IVC list in boxes 1206 and 1207. The file containing the list is then processed to generate the structure IVC in box 1211.

Similar to separating identification of changes to content and changes to file structure, changes to file attributes can be examined separately by use of an IVC generated in boxes 1212-1214. This can become important in situations wherein the initial IVCs were generated while a collection of files was on magnetic media, and then later the files were written to optical media, resulting in a change of the file attributes to read only. Some embodiments of method 1200 thus enable identification that an attribute change has taken place. In many operating systems (OSs), file attributes may be handled as integers, with specific bits of the integers representing logical attribute flags. In box 1212, the attribute flags, whether in integer or other representation, are compiled into a text file, which is sorted and/or otherwise modified in box 1213 according to one or more of boxes 1206, 1207 and 1210, to maintain consistency with the other IVCs. That is, the position of a particular file's name and path information in the directory structure information file may correspond to the position of the IVC for that file in the compiled IVC text file. If a particular duplicate file was deleted from the text files used to generate the content IVC and the structure IVC, it may not be desirable to retain a representation of that file in the attribute IVC. The attribute IVC is generated from the text file in box 1214.

If a single IVC is desired to simultaneously represent two or more of the content IVC, the structure IVC, and the attribute IVC, these are put into a text file in box 1215, and a composite IVC is generated in box 1216. The user now has four IVCs from which to choose as representative of the collection of files thus processed. Any combination of the content IVC, structure IVC, attribute IVC, and composite IVC may be sent to a DDL, depending on the submitter's anticipated needs. It should be understood that method 1200 may be tailored to a user's needs, including omitting unnecessary processes.

Generating and reporting IVCs in accordance with method 1200 has some advantages over the common practice of generating and reporting IVCs for each file individually. 1) The representation is compact, and so can be communicated easily. If IVCs were generated for each file individually, and stored securely in some location, and then IVCs were generated for the collection, the collection IVCs could be communicated first to any entity which desired to validate the collection. If the validation of the collection IVCs was successful, then the individual IVCs are not needed. Only if the collection IVCs failed the matching tests would the larger set of individual IVCs need to be provided. 2) The content IVC reduces the amount of information that is required to verify that no tampering has occurred. If a DVD is provided to a recipient who suspects that a DVD containing thousands, or tens of thousands, of files has been intercepted and substituted by a malicious third party, the recipient must obtain not only all the IVCs from the purported DVD creator, but also an extensive list of all the files on the DVD in order to identify any additions. If there has been any tampering, then such a list would be needed. However, if there has not been any tampering, a single content IVC will indicate that the DVD is intact, and that no files have been added, even without comparing a directory listing with a previously-generated list of files. 3) The use of the three separate IVCs enables identification of permissible changes to files, such as changing to read-only when being written to permanent media. 4) The use of the three separate IVCs enables separate identification of different types of changes to the file collection (content, directory structure, and attributes), while preserving indication of aspects which have not changed.

An embodiment of an IVC generation system receives a plurality of files having an associated directory structure, generates an IVC for each of the files, generates a list of the IVCs, and generates a content IVC representing the list of IVCs. The system may further sort the IVCs in the list of IVCs. The system may further delete duplicate IVCs from the list of IVCs. The system may further generate a file containing directory structure information and generate a structure IVC from the file with the directory structure information. The system may further alphabetize the file with the directory structure information. The system may further sort and modify the file with the directory structure information to correspond with sorting and modifying the list of IVCs. The system may further generate a file containing attribute information and generate an attribute IVC from the file with the attribute information. The system may further sort and modify the file with the attribute information to correspond with sorting and modifying the list of IVCs. The system may further sort and modify the file with the attribute information to correspond with sorting and modifying the file with the directory structure information. The system may further select two or more of the content IVC, the structure IVC and the attribute IVC and generate a composite IVC from the selected IVCs. The system may further communicate at least one of the content IVC, structure IVC, attribute IVC, and composite IVC to a DDL. The system may comprise a processor and/or software embodied on a computer readable medium.

Figure 13:
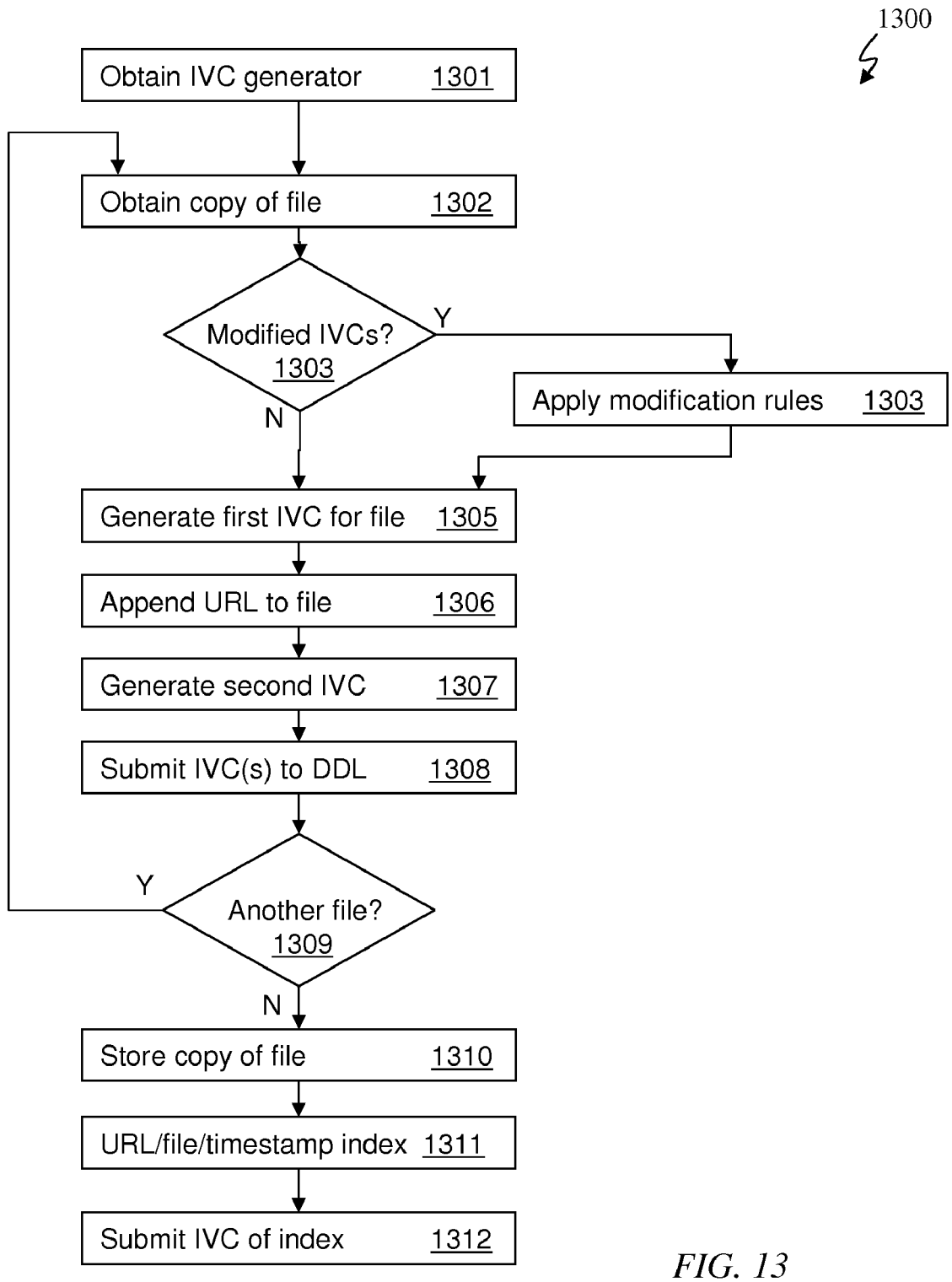
FIG. 13 illustrates a method of generating entries for a DDL in conjunction with updating a controlled archive.

FIG. 13 illustrates a method 1300 of generating entries for a DDL in conjunction with updating a controlled archive using documents found in a public forum, such as on the internet. Method 1300 prepares a collection of documents for later date assertions, when the question of whether the documents existed as of the current date is expected to be questioned or challenged. Embodiments of method 1300 are used in generating date-provable archives of documents created by others. Examples of uses for method 1300 include generating an archive of technical documents for anticipated use during examinations of patent applications and also collecting evidence for an anticipated civil litigation or criminal prosecution, if the documents indicate activity likely to be denied by the authors at a later time.

In box 1301, an IVC generator is obtained, and a copy of a file to be archived is obtained in box 1302. The file may represent a single website page or other document, or a collection. The documents may be obtained by saving visited websites, copying files from an optical or magnetic computer readable medium coupled to a computer, or by another method. The selection of generating IVCs on the entire file contents or else using modification rules is made in decision box 1302. For websites html pages, it may be desirable to modify copies to exclude certain types of hyperlinks, advertisements, graphics, and portions of the file that do not pertain to the substance later to be asserted. If modifications are to be implemented, the rules are applied in box 1304, and method 1400 proceeds to generate an IVC in box 1305. Based on the modified IVC generation rules followed, multiple IVCs may be generated in box 1305. In box 1306, the uniform resource locators (URL) or other location identification information is appended to the copy of the file, to prepare for assertion of where the document was found. A second IVC is created in box 1307, reflecting the file appended with the location information. Although appending a URL to a saved copy of a webpage does not prove that the copy necessarily represents content found at the URL, the record will have some enhanced value if the credibility and integrity of the archiving process can be established.

One or more of the IVCs is submitted to a DDL in box 1308. A copy of the file is stored in a controlled archive in box 1310, and a database linking the IVC, URL, file name, and DDL timestamp or edition is appended in box 1311. An IVC for the database is generated and submitted to the DDL in box 1312. The value of submitting the IVCs to a DDL is that, when the documents need to be date proven, an asserted date may be established, even if the credibility of the archive maintainer is questioned. For example, one party in a dispute may assert that certain material had been posted to a website prior to a critical date, whereas the opposing party may claim it occurred later. If the party asserting the earlier date had implemented an embodiment of method 1300 on or before the critical date, the issue could be settled easily.

An embodiment of an IVC generation system receives a plurality of files from a plurality of visited websites or from a computer readable medium coupled to a computer, generates a first IVC for each of the files, appends location or name information to each of the files, generates a second IVC for each of the files, submits at least one of the IVCs to a DDL, stores copies of the files, and generates a database correlating the IVCs with the file names, location information, and/or DDL time information. The system may comprise a processor and/or software embodied on a computer readable medium.

Figure 14:
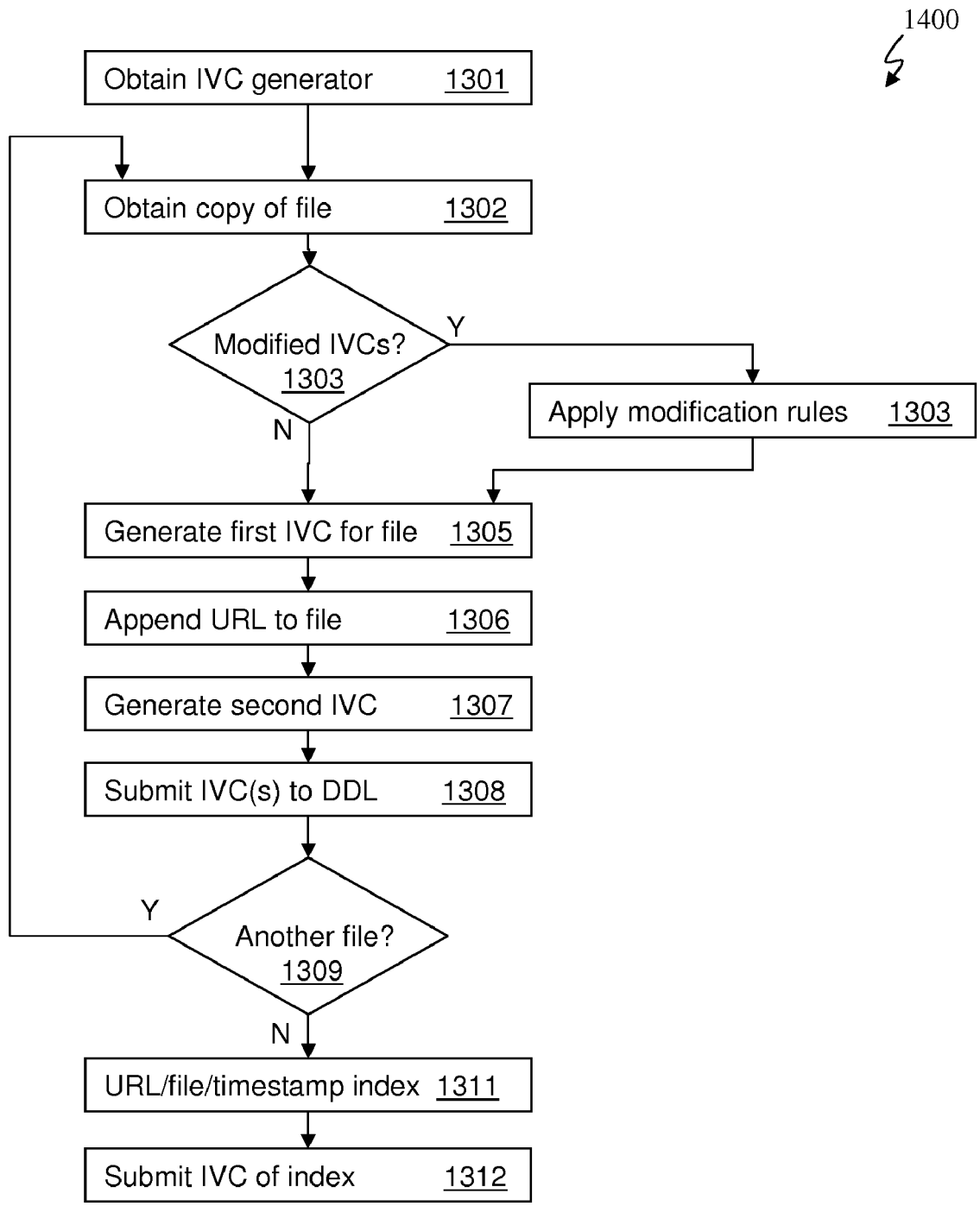
FIG. 14 illustrates a method of generating entries for a DDL representing files stored outside of a controlled archive.

FIG. 14 illustrates a method 1400 of generating entries for a DDL representing files stored outside of a controlled archive. Method 1400 is similar to method 1300, shown in FIG. 13, with a notable exception: box 1310, indicating a process of storing a copy in a controlled archive is omitted. Omitting the process of generating a controlled archive can provide considerable cost savings over prior art methods which require that a copy must be archived of every file for which a date may be asserted in the future.

Method 1400 allows for proving an asserted date for a file without retaining a copy, although it does involve the risk that the file will no longer exist at the needed time. In exchange for accepting this risk, the storage facilities of others may be leveraged at no cost to the entity generating the IVCs for the DDL and having an interest in asserting a date. Method 1400 has application when large volumes of files, or perhaps only a few files that are of significant size, are expected to be retained by others. Both of methods 1300 and 1400, along with others disclosed herein, may be done covertly, so that even the author of a file posted on a website is unaware that an IVC representing the file has been submitted to a DDL, unless the author independently generates an IVC and searches publicized DDL editions for a match.

Figure 15:
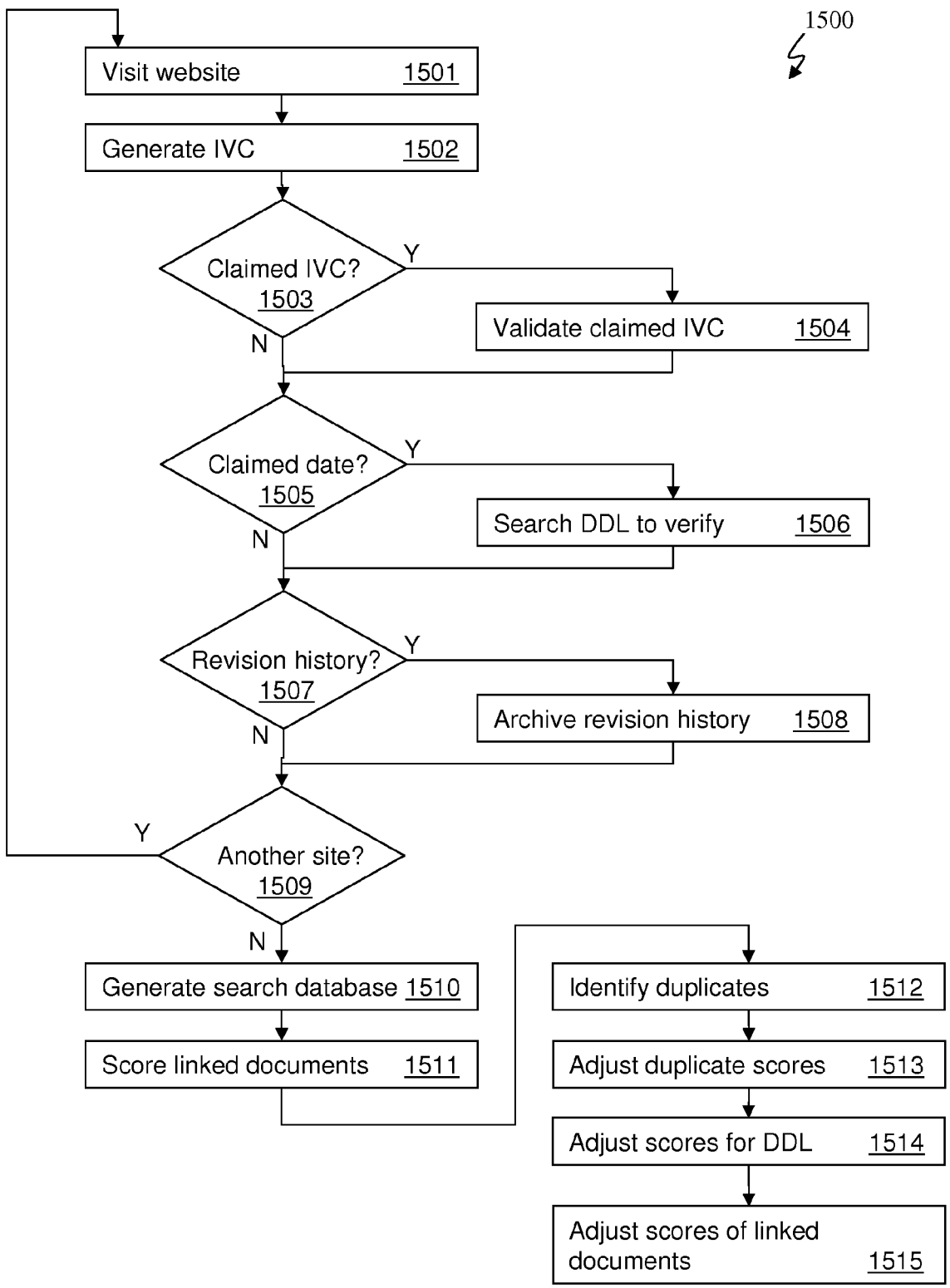
FIG. 15 illustrates a method of building a search engine database.

FIG. 15 illustrates a method 1500 of building a search engine database. Method 1500 is similar to methods 1300 and 1400, although some differences facilitate utility for a search engine user. Method 1500 can be used with or without a cache system that retains copies of expired or unavailable website pages. Search engines typically perform extensive searches of websites, identify key terms in files found at the websites, and build a database relating the keywords to the URLs. When a searcher, visiting the search engine website, enters search terms, the database is searched at that time, rather than the internet. Search results are then presented to the searcher using the database entries. Embodiments of method 1500 generally pertain to the generation of an improved database, whereas embodiments of method 1600, described later with reference to FIG. 16, generally pertain to generation of search results for presentation to a searcher, using a database similar to a database generated in accordance with an embodiment of method 1500.

In box 1501, a website is visited by the system building the search database to collect keywords, and in box 1502, an IVC is generated for a file found at the website. The website operator may have prepared the document for later date proofing in an attempt to render it tamper-evident, and thus may have previously generated an IVC for the file. The IVC and information facilitating reproduction may be within the file itself, or in an auxiliary file containing the IVC for that file and possibly others. In some embodiments, a visited website will have a filename associated with IVCs. If one is provided by the website, as determined in decision box 1503, method 1500 allows for validating the claimed IVC in box 1504. In some situations, the IVC claimed by the website operator may have been generated with a different IVC generator, and/or rules, than what is typically used by the search engine database builder. In some situations, this condition can be determined by examining the IVC generation identification information, if available. In some embodiments, boxes 1502 and 1503 may be swapped for efficiency, so that only a single IVC is generated, the one used to produce the claimed IVC. In some embodiments, the search engine database builder uses a preferred IVC generator and generates additional IVCs for validation purposes.

The website operator may be asserting a date for the document, and back this up with information pointing to a DDL record in a published DDL edition. If a date is asserted by the website, as determined in decision box 1505, method 1500 allows for searching a DDL edition for a match in box 1506, to verify the claimed date. If the website does not provide information suitable to sufficiently narrow a DDL search for a match with the IVC, archived results of prior searches, if available, can be used to determine a date. For example, an archive, such as a search engine cache, may have multiple stored versions of a website's contents. If a particular document appears in one version, but not in the version archived immediately prior in time, the DDL search could start with a set of DDL editions which were open during the period between the times the two archives were generated. The earliest DDL edition in which an IVC match is found can be reported as the document date. The claimed IVC and/or date, along with indicia of validity, and possibly an independently determined date, may be put into the search database, if the search engine operators deem such information relevant.

A document author who revises documents, but yet wishes to keep a record of revisions, for example revisions of changes to legislation in public law records, often puts a revision history in a footnote or in a revision section of the document. In order to work with an IVC system, the document author should include in the footer, along with the dates and descriptions of the revisions, IVCs for the documents as published on the identified dates. When a copy of a document is alleged to be a prior revision, the information necessary to verify the claim can then be found in the current document. Method 1500 facilitates tracking revision histories by identifying one in decision box 1507 and storing it in box 1508. As indicated by box 1509, boxes 1501-1508 are iterated in order to generate the searchable database, as represented in box 1510. The database entries may include an IVC generated for a document, dating information, claimed, verified, and/or independently determined, and information necessary to locate a DDL edition record for the document.

For typical search engines, the database has so many entries for common key words, that it is desirable to score the documents, as indicated in box 1511, to facilitate search result ranking. Some methods of scoring documents for search engines are disclosed in U.S. Pat. Nos. 6,285,999; 6,799,176; 7,058,628; and 7,269,587 to Page (collectively "Page"). These patents claim: ('999) A computer implemented method of scoring a plurality of linked documents, comprising: obtaining a plurality of documents, at least some of the documents being linked documents, at least some of the documents being linking documents, and at least some of the documents being both linked documents and linking documents, each of the linked documents being pointed to by a link in one or more of the linking documents; assigning a score to each of the linked documents based on scores of the one or more linking documents and processing the linked documents according to their scores. ('176) A computer implemented method for scoring documents, at least some of the documents containing links to other ones of the documents, the method comprising: determining a probability that a searcher will access each of the documents after following a number of the links; and scoring each of the documents based on the determined probability. ('628) A computer implemented method of scoring a plurality of linked documents, comprising: identifying a plurality of documents, at least some of the documents being linked documents, at least some of the documents being linking documents, and at least some of the documents being both linked documents and linking documents, each of the linked documents being pointed to by a link in one or more of the linking documents; assigning a score to each of the linked documents based on scores associated with the one or more linking documents; and processing the linked documents according to the assigned scores. ('628) A computer implemented method of scoring a plurality of documents, comprising: identifying a plurality of linked documents; identifying linking documents that link to the linked documents; determining a score for each of the linked documents based on scores of the linking documents that link to the linked document; and processing the linked document according to the determined scores. ('587) A computer implemented method for calculating an importance rank for N linked nodes of a linked database, the method comprising: (a) selecting an initial N-dimensional vector $p_0$, wherein each component of $p_0$ represents a probability that a user will start at a given node, wherein each node of the N linked nodes is a computer-readable document containing information; (b) computing an approximation $p_n$ to a steady-state probability $p_\infin$, wherein each component of $p_\infin$ represents a probability that the user will randomly end up at a particular node after following a number of forward links, in accordance with the equation $p_n = A^n p_0$, where A is an N.times.N transition probability matrix having elements $A[i][j]$ representing a probability of moving from node i to node j; and (c) determining a rank r[k] for a node k from a k.sup.th component of $p_n$, wherein r[k] represents an importance of the information contained in node k.

In the terminology used in the claims, the linked database can be the internet, linked documents include those pointed to, for example with a URL, and linking documents are those pointing to other documents, for example by containing a URL. A document may be simultaneously a linked document and a linking document. Processing includes activity necessary to generate search result lists that rank the documents according to the scores, upon a searcher providing a list of search terms.

A curious result of these methods is that they all allow for a possibility that appears invalid on its face. If two identical documents are available on the internet, but at different websites, their scores may be significantly different. One document may be ranked quite high, whereas an exact duplicate of that document may be ranked quite low. Thus, the fact that the content of a first document is effectively identical to the content of a second document is irrelevant when generating the scores used for ranking according to Page.

Using the methods and systems disclosed herein, including the incorporated U.S. patent application Ser. No. 12/053,560, "DOCUMENT INTEGRITY VERIFICATION", a method of identifying duplicate documents can be used to adjust the scores of documents based on scores of their duplicates, for example by normalizing them to values closer together. Scores for documents linked to one of the duplicates may also be adjusted. Further, identification of document duplicates can assist with determining an earliest date, in the event that some of the duplicate copies are not dated or are associated with later dates.

It is important to note that Page clearly teaches away from this novel improvement to document scoring. Specifically, Page states "Intuitively, a document should be important (regardless of its content) if it is highly cited by other documents." (Column 2, line 60 of '628, emphasis added.) Thus, Page explicitly teaches that scoring should not take document content into regard.

Since determining duplication among a set of documents necessarily requires taking content into regard, Page unambiguously teaches away from identifying duplicates when scoring and ranking document importance. Also, since determining document integrity necessarily requires taking content into regard, Page unambiguously teaches away from independently determining a document age or date when scoring and ranking document importance.

It is also important to note that neither comparing document names for similarity, nor comparing sets of detected keywords, provides a reliable comparison for content duplication. Two documents or files having identical content may have different names, based on the filing and naming convention used by various entities on possession of them. Additionally, many documents with widely varying content may be assigned a common default name, such as "New Microsoft Word Document.doc". Identifying a plurality of documents all having the same name, therefore is not an identification of document duplicates. Further, some prior art search engines may identify similar keyword patterns in a plurality of documents, and upon identifying some of them as similar to documents that will appear in a search result list, at least some of the similar documents will be suppressed from appearing on the list. However, using a similarity in keyword detections is not a detection of duplicates, because such similarity detections currently allow for differences in keyword count, and even if identical keyword detections were required, the results would be exceedingly over-inclusive in an overwhelming majority of cases.

There is a difference between scoring a document and ranking the document in a search result list. A score and a rank are both search result list generation parameters, and either or both may be adjusted responsive to identifying duplication in a set of files. A score is a value or calculation associated with the document in a generated database correlating an identification of the document and/or its location, for example a URL, with a keyword useable for matching with search terms. A score is generated prior to a search by a searcher. A ranking is the ordering of list items, such as the document or a group of similar documents, in a search result list generated for a searcher in response to a search being conducted. In the absence of an adjustment to a ranking, a common default condition would be that ranking would be ordered according to scoring, typically with a higher score producing a higher rank that appears earlier in the list. Method 1500 pertains predominantly to scoring, whereas method 1600, illustrated in FIG. 16 and described in more detail later, pertains predominantly to ranking. Both methods have overlapping considerations, and to a large extent, both methods may use similar approaches to detecting duplicates. Further, additional methods f scoring may be utilized in box 1511, in addition to or instead of those taught by Page. Additional methods may include site popularity, as measured by the number of independent visitors, keyword counts, keyword breadth, and others.

In box 1512, duplicates are detected, thereby identifying at least one set of duplicates. Identification of duplicates can be computationally intensive, and therefore provides a plethora of opportunities for improvements in efficiency. An embodiment of a detection method is described, although it should be understood that many variations are possible that could operate more quickly, with a higher probability of detection, and/or with a lower rate of false alarms. To cut duplicate search time, comparing the IVCs may be done in stages, such that a first portion, possibly less than a full message digest, is compared. Responsive to a match, an additional portion is compared. For example, the first N bits of a message digest may be used in an equality comparison on processor capable of handling an N-bit integer with a single arithmetic operation. If there is a difference in the first N bits, further bits need not be tested, although if there is a match, the next set of N bits may be treated as integers for a rapid equality test. This may be iterated until two document IVC excerpts are found to no longer match, or else enough of the IVCs have been compared to merit a more comprehensive document similarity test, such as a bit-by-bit comparison. In some embodiments, a cyclic redundancy check (CRC) can be used as an initial IVC for duplicate detection, since CRCs can generally be calculated more rapidly than MD-5 and SHA hash functions. However, since CRCs allow for collisions, a low-collision IVC may be used to suppress false alarms. Similarity criteria comparisons can be used for false alarm rejection, intermingled with comparing additional IVC portions, including similarity criteria that cannot establish duplication, such as comparing file sizes and/or keyword count, because using such comparisons may be faster for rejecting false alarms than would be generating a longer IVC. Additional non-IVC similarity checks may be performed prior to, during, or after the IVC portion duplication checks. Using IVCs to test documents encountered by a webcrawler may generate such a large volume of IVCs that it will allow for studying collision rates for various IVC generators. However, for identifying duplicate documents on a large scale, a CRC algorithm provides faster IVC generation. Generally, the faster the calculation, the higher the probability of a false alarm.

Some embodiments may generate IVCs for only content deemed to have importance for determining duplication, and other content which is unimportant and is therefore nondeterminative of duplication. Two documents can then be identified as duplicates if the important content matches, but the unimportant, excluded content differs. Examples include advertising information, such as banners, content that may be generated specific to certain visitors, content generated based on visitor number, and content that is likely to be excluded from a search database. The use of modified IVC generation or non-modified IVC generation may be determined by file type. For example, modified IVC generation might not be used with PDFs and other files having file name extensions indicating some degree of stability. However, files having an html extension may be subject to modified IVC generation that excludes file content that is likely to change rapidly and be unimportant to a document searcher. Thus, two files may differ by factors deemed to be unimportant for duplication detection, and still be identified as duplicates for the purposes of search engine scoring and result list ranking.

In box 1513, the duplication information is used to adjust the score of at least one of the linked documents. One theory applicable to adjusting scores is that a higher count of duplicates indicates wider recognition of importance. Another theory is that each copy of a single base document, possibly allowing for unimportant changes, should receive the same importance score, since the substantive content is the same. Neither theory is perfect, but both may be used as guidelines in adjusting a score. Adjusting the score of a document would result in bringing its score closer to the score of a duplicate. Possibilities include adjusting the score of one or more of the duplicates closer to a score for another document in the same set of duplicates. Possibilities also include calculating an average of all the duplicates found, and adjusting the score for at least one of the duplicates by moving it closer to the average. Some embodiments may assign the average as a common score to all duplicate document copies, whereas other embodiments may use the average as a factor and allowing at least some of the duplicates to retain differing scores. If a particular document has a large number of detected duplicates, the distribution of the scores prior to adjustment based on the duplication detection may provide a metric for comparing the validity of a particular scoring algorithm. Thus, method 1500 has an added value of providing an opportunity to refine search engine document scoring methods.

In box 1514, a DDL edition is used to provide information useable to adjust a document's importance score. Some theories for the relationship between a DDL and a document's importance include that a provably older document may be more important for certain keywords, and that a document for which an IVC can be found in a DDL is more important, based on the fact that it can be tested for integrity and has been deemed significant enough for registration with a DDL. Thus, detecting an IVC for a file in a DDL edition may provide a basis for raising the document's importance score over an otherwise similar document. Additionally, based on a combination of keywords found in a document, an older document may have its score raised. At least some of the theories for adjusting a document score also apply to adjusting the document's rank in a search result list. In box 1515, scores are adjusted for documents linked to those with adjusted scores.

Figure 16:
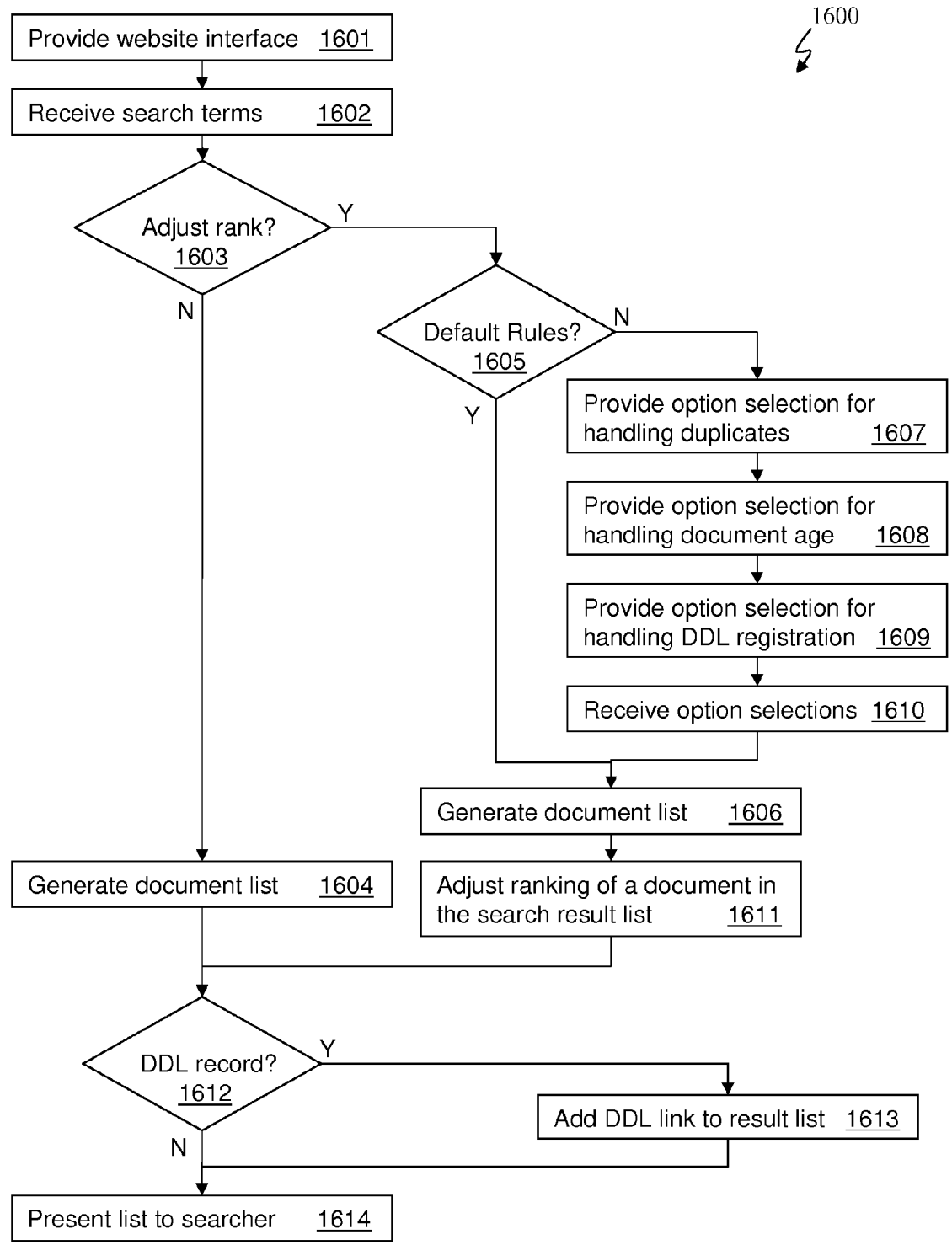
FIG. 16 illustrates a method of providing website information using a search engine database.

FIG. 16 illustrates a method 1600 of providing website information using a search engine database. In box 1601, a search engine website interface is provided, which includes a search term entry module. The search terms desired by a searcher are received in box 1603. A decision is made as to whether to allow for adjustments to the rankings of documents in a generated search result list, in decision box 1603. If no rank adjustments are to be made, then in box 1604, a search result list is generated according to the document scores, which may reflect scoring adjustment due to age, DDL registration and/or duplication. If a rank adjustment will be allowable, then decision box 1605 determines whether it will be according to default rules or user option selections. In some embodiments, there may be a mixture between default rules for some options and user selection for others.

If default rules are to be used, method 1600 proceeds to box 1606, in which a search result list is generated. The processes represented by boxes 1604 and 1606 may be similar, and may involve searching through a previously-compiled database for keywords that are similar to search terms and variations, such as corrected spellings and/or plurals, of search terms. In some embodiments, the database keywords are root words, rather than the exact versions of the words appearing in the corresponding document. In box 1607, if default rules are not to be used for handling duplicates, the searcher (the search engine user) is provided with an option selection for handling duplicates. Options may include one or more of grouping duplicates together in the result list, suppressing duplicates in order to provide a more diverse result list, prioritizing documents with a high number of duplicates, deprioritizing documents with a high number of duplicates, and ignoring duplicates. In box 1608, the searcher is provided with an option selection for handling document age. Options may include one or more of grouping common ages together in the list, provide a more diverse result list based on age, prioritizing documents with an older date, deprioritizing documents with an older date, and ignoring age. In box 1609, the searcher is provided with an option selection for handling the result of the search engine database generation method identifying a DDL record corresponding to a document. Options may include one or more of grouping common registered documents in the list, provide a more diverse result list, prioritizing registered documents, deprioritizing registered documents, and ignoring DDL records. The user selected options are determined in box 1610.

In box 1611, the ranking of at least one list item, indicating a document, is adjusted in the search result list. A list item for a document identified in the search result list may comprise a hyperlink to the document; a preview description; a claimed date; a verified age; a date of a DDL edition having a registration record for the document; at least one portion of an IVC, claimed and/or independently generated; information to assist with independent verification, such as a link to an online DDL edition and IVC generation information; a count of duplicates; links to duplicates of the document; and indication as to whether a document has been registered with a DDL. It should be understood that, in some embodiments, additional or less information may be provided. In some embodiments, if the search engine database generation process did not independently validate claimed age and IVC information, the search result list may provide information to a searcher to facilitate a validation, such as a hyperlink to a DDL edition and/or a website hosting a DDL.

With embodiments of method 1600, a searcher may specify whether a document's age, number of duplicates, and/or registration with a DDL to enable date proving and integrity verification, render a document more important or less important. Additionally, grouping list items enables a searcher to see multiple options for sources of the same document. For example, if a searcher was looking for a specific document known to be available from multiple websites, once the searcher scrolls through the list to identify one copy of the document, the other copies are more readily available. However, if a certain document was widely copied and dispersed, but is of no interest to a searcher who selected a diverse list, the searcher does not need to scroll past a large number of effectively duplicated list items. The effectively duplicated list items differ mainly by URL rather than substantive content, and waste search time if a searcher is looking for a relatively obscure list item. One possible option for implementing a grouping adjustment is to place duplicates under a single list item, indicating multiple duplicates are available, and using the URL of the highest scored version of the duplicates, so that the search result list is hierarchical. Selecting the list item would then either select the featured copy or provide a list of the duplicates, based on provided links and/or user selection. The higher level of hierarchy, above a list of effective duplicates, would then provide a diverse list, likely more compact, since duplicates are pushed down to a lower level, rather than remaining on a single level. Thus, embodiments of method 1600 generate a search result list as a hierarchical list, wherein a first list level is diverse with respect to document duplicates, and a lower list level identifies document duplicates. Hierarchical groupings may also be provided in a search list based on age and/or DDL registration.

In decision box 1612, a decision is made as to whether a DDL link will be included in a list item. Providing a DDL ill enable a user to validate a claimed age and DDL registration independently which, in some situations, may reduce the computational search load on search engine equipment compiling the search engine database. If so, a link is added in box 1613, and the search list is presented to the searcher in box 1614.

A computer implemented method of scoring a plurality of documents may comprise: identifying a plurality of linked documents; identifying linking documents that link to the linked documents; determining a score for each of the linked documents based on scores of the linking documents that link to the linked document; processing the linked document according to the determined scores; identifying, within the plurality of linked documents, at least one set of duplicates; and for a first linked document in the set of duplicates, adjusting the score and/or a ranking of the document in a search result list. The method may further comprise generating a first IVC for each of the linked documents. The method may further comprise submitting at least one of the generated IVCs to a DDL, wherein generating an IVC may comprise generating a hash function message digest and/or calculating a CRC. Identifying a set of duplicates may comprise comparing at least a first portion of the first IVC for the first document with a corresponding portion of the first IVC for a second document. Identifying a set of duplicates may comprise comparing a second portion of the first IVC for the first document with a corresponding portion of the first IVC for the second document, responsive to identifying a match between the compared IVC portions. Identifying a set of duplicates may comprise generating a second IVC for each of the first document and the second document, responsive to identifying a match between the compared IVC portions; and comparing at least a portion of the second IVC for the first document with a corresponding portion of the second IVC for the second document. Identifying a set of duplicates may comprise comparing a size of the first document with a size of a second document.

Adjusting the document score may comprise changing the score to a value closer to a score of a duplicate of the first document. This may involve bringing one score closer to another, and/or averaging multiple scores and bringing a score for at least one of the duplicates closer to the average score. Adjusting a ranking of the document in a search result list may comprise moving a list item indicating the first document closer to a list item indicating a duplicate of the first document, thereby displacing another list item in the search result list. Adjusting a ranking of the document in a search result list may comprise moving a list item indicating the first document away from a list item indicating a duplicate of the first document, thereby displacing another list item in the search result list. The method may further comprise adjusting a score for at least one document not identified has having a duplicate, and linked to the first document. Identifying a set of duplicates may comprise identifying, within each of the linked documents, content that is determinative of duplication and content that is not determinative of duplication, wherein the set of duplicates comprises a second document having determinative content identical with the first document and nondeterminative content differing from the first document. The method may further comprise determining a date for the first document. The method may further comprise adjusting a score and/or a rank based on the date. The method may further comprise adjusting a score and/or a rank based on the document displaying a claimed date and/or IVC. The method may further comprise adjusting a score and/or a rank based on an IVC representing the document appearing in a DDL. The method may further comprise searching a DDL edition for a match with the first IVC. The method may further comprise receiving, from a searcher, an option selection indication for processing duplicate documents; and generating the search result list responsive to the received preference. The method may further comprise receiving, from a searcher, an option selection indication for processing documents based on age; and generating the search result list responsive to the received preference. The method may further comprise receiving, from a searcher, an option selection indication for processing documents based on representation in a DDL; and generating the search result list responsive to the received preference. The method may further comprise presenting, to a searcher, an option selection, wherein the option selection comprises a first option for grouping document duplicates in the search list and a second option for presenting a diverse search list. Many of the boxes illustrated in any methods associated with a particular one of FIGS. 9-21 can be used with methods associated with another of the FIGURES.

A computer program embodied on a computer executable medium and configured to be executed by a processor may comprise: code for identifying a plurality of linked documents; code for identifying linking documents that link to the linked documents; code for determining a score for each of the linked documents based on scores of the linking documents that link to the linked document; code for identifying, within the plurality of linked documents, at least one set of duplicates; and code for adjusting at least one search result list generation parameter responsive to identifying the set of duplicates. An apparatus for scoring a plurality of documents may comprise: a processor; a computer readable medium comprising: a database correlating locations of each of a plurality of linked documents with keywords, importance scores, and indicia of content duplication; and a search module configured to adjusting the importance score a document and/or a ranking of the document in a search result list. An embodiment of apparatus is illustrated in further detail in FIG. 23, although for many applications, not all elements of the illustrated apparatus are necessary.

Figure 17:
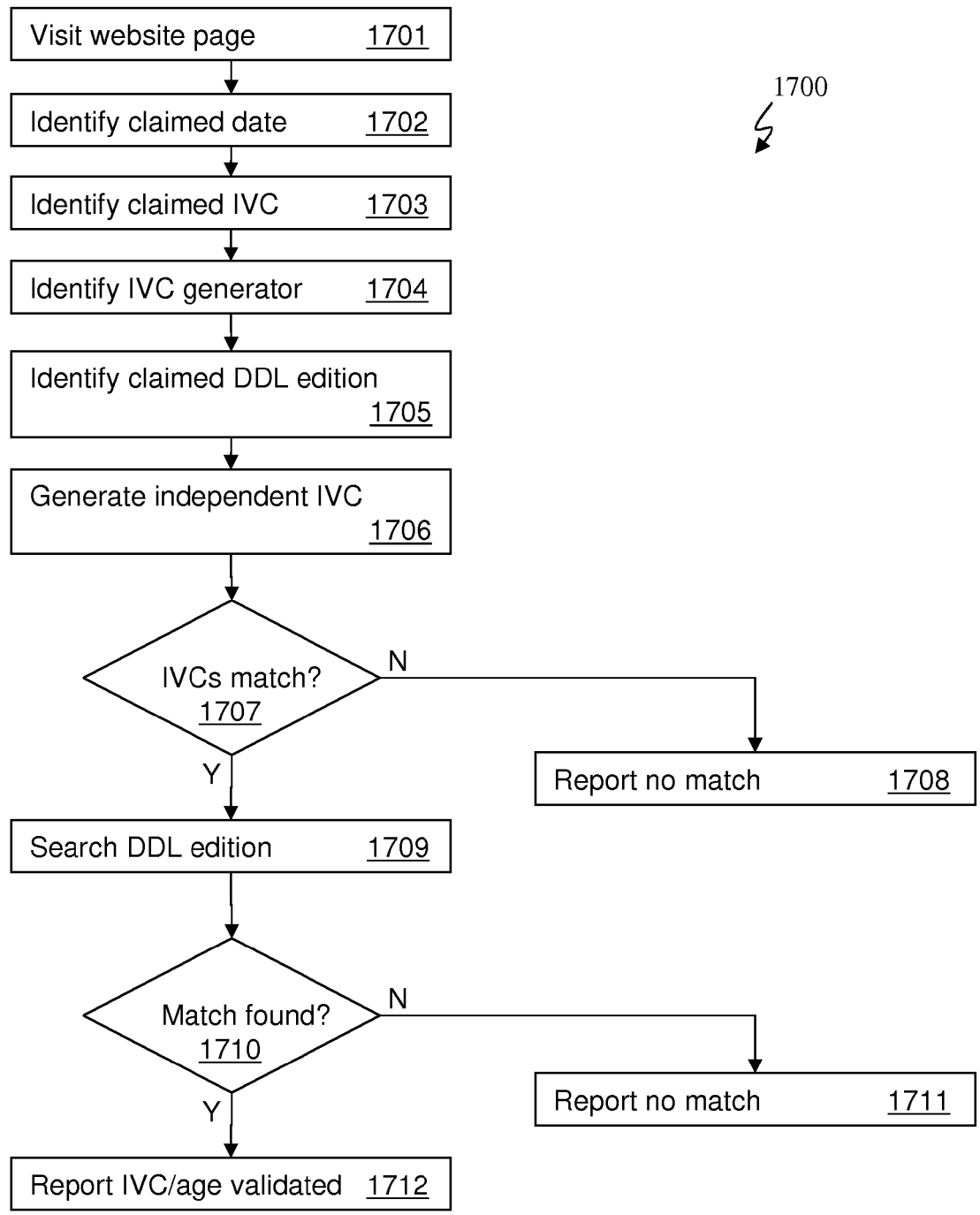
FIG. 17 illustrates a method of determining a date for an internet file, using a DDL with an internet browser.

FIG. 17 illustrates a method 1700 of determining a date for an internet file using a DDL with an internet browser. In some computing systems, an internet browser plug-in and/or functional module can be configured to implement an embodiment of method 1700 in an automated fashion, so that a user is automatically provided with a final determination result. In box 1701, a website is visited to view or download a document, and a claimed date, if any, is identified in box 1702. In box 1703, a claimed IVC is identified and, if information is furnished to facilitate independent reproduction of the IVC, that information is identified in box 1704. Such information may be in the document itself, or the website provider may provide a special directory for IVC and date related information, which is automatically parsed by a browser or browser plug-in. An identification of a DDL edition having a record for the document is made in box 1705. In box 1706, a verification IVC is independently generated, which may involve the internet browser automatically searching the internet for a copy of an IVC generator identified in box 1704. In decision box 1707, the independently generated IVC is compared with a claimed IVC, if one was claimed. If there is no match, an invalid claimed IVC is reported in box 1708. In box 1709, a DDL is searched, likely the claimed edition, if one was identified in box 1705, and a determination of a match with a published record is made in decision box 1710. If no match is found, this is reported in box 1711, and may indicate a tampered document, an invalid claim, and/or an unavailable DDL, among other possible situations. If a match is found, this is reported in box 1712 as a validation of the IVC match and/or date claim.

An embodiment of an internet browser and/or an browser plug-in is configured to identify a claimed date of a visited website file, identify a claimed IVC, identify IVC generating information, generate an IVC for the file, compare the claimed IVC with the generated IVC, search a DDL for a published IVC matching the generated IVC and/or claimed IVC, and/or report an indication of matching and/or mismatching results. Embodiments of internet browsers, browser plug-ins, and/or other software related to any of the disclosed methods, may comprise a computer program embodied on a computer readable medium and configured to be executable by a processor. Embodiments may also comprise hardware, including ASICs and FPGAs.

Figure 18:
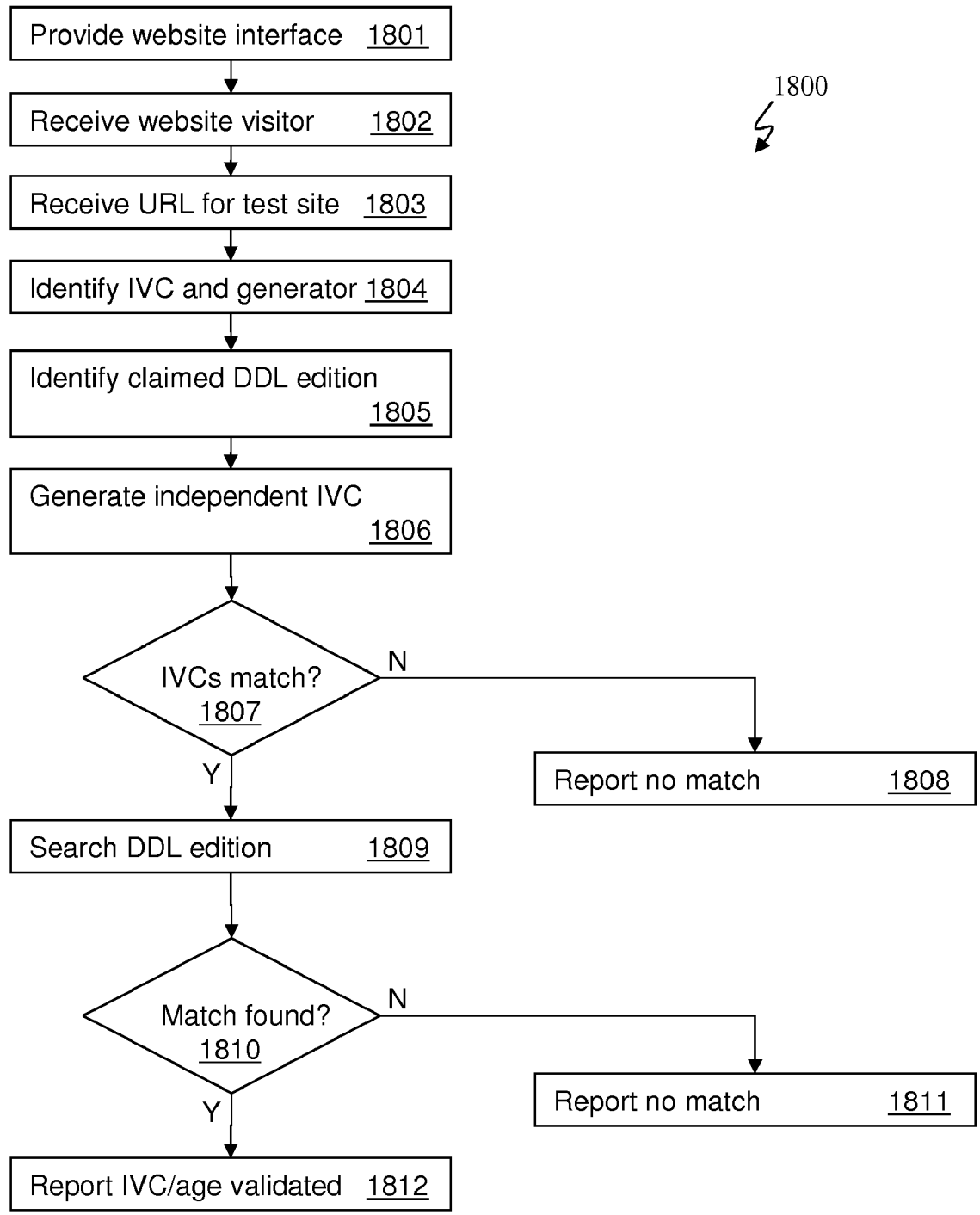
FIG. 18 illustrates another method of determining a date for an internet file, using a DDL with an internet browser.

FIG. 18 illustrates a method 1800 of determining a date for an internet file using a DDL with an internet browser. Method 1800 can be provided as a service for website visitors seeking to test other websites, but lacking access to the IVC generator, DDL access, sufficient communication channel capacity, and/or sufficient processing power. One example would be a user who using a computing device limited in processing capacity, such as a cellular communication device, to visit various websites, and wishes to verify a website's claims of document age and integrity. A computing resource, whether software and/or hardware, may be configured to interface with a remote system operating in accordance with an embodiment of method 1800. Using method 1800, a computational and searching capability can be provided to remote users, thereby furnishing them with functionality similar to that furnished by method 1700.

In box 1801, a website interface is provided for visitors, which is configured to accept an indication of a URL pointing to the file to be checked for integrity and/or date. In box 1802, a visitor is received, either at the direction of the user, or automatically, based on redirection from referring website and/or browser automatic dating functionality. The URL for the file to be tested is received in box 1803. Optionally, the claimed IVC may be provided, in addition to or instead of the URL. In box 1804, the claimed IVC and generation information is received. Options for performing this process include receiving the information from the visitor's computing resources and independently visiting the URL or another node storing the information for the document at the identified URL. If generating information is not provided, the method, or any others disclosed herein, may perform a trial-and-error test using a set of likely IVC generation functions. In box 1805, the DDL edition containing a record for the document is identified, according to the claims of the website operator hosting the tested document. Alternatively, another database can be referenced that linked the document, either by URL or name, to a DDL edition. If this information is not provided, the DDL search may take longer, but may still be possible in some circumstances.

A verification IVC is generated in box 1806, and it is tested for a match with the claimed IVC, if one exists, in decision box 1807. If there is a mismatch, this is reported to the user's computing resources in box 1808. If there is a match, or else no claimed IVC was identified, the DDL is searched for a record having a match with the independently generated verification IVC in box 1809. A mismatch, as determined in decision box 1810, is reported in box 1811, whereas a match, indicating a validation, is reported in box 1812. It should be understood that variations exist, including that the file validation system receives the document itself from a visitor, in addition to or instead of the URL or other location information.

An embodiment of an internet file validation system comprises an apparatus configured to receive an input identifying a file to be validated; to identify a claimed date of the file; to identify a claimed IVC representing the file, to identify IVC generation information; to generate an IVC for the file; to compare the claimed IVC with the generated IVC; to search a DDL for a published IVC matching the generated IVC and/or claimed IVC; and/or to report an indication of matching and/or mismatching results.

Figure 19:
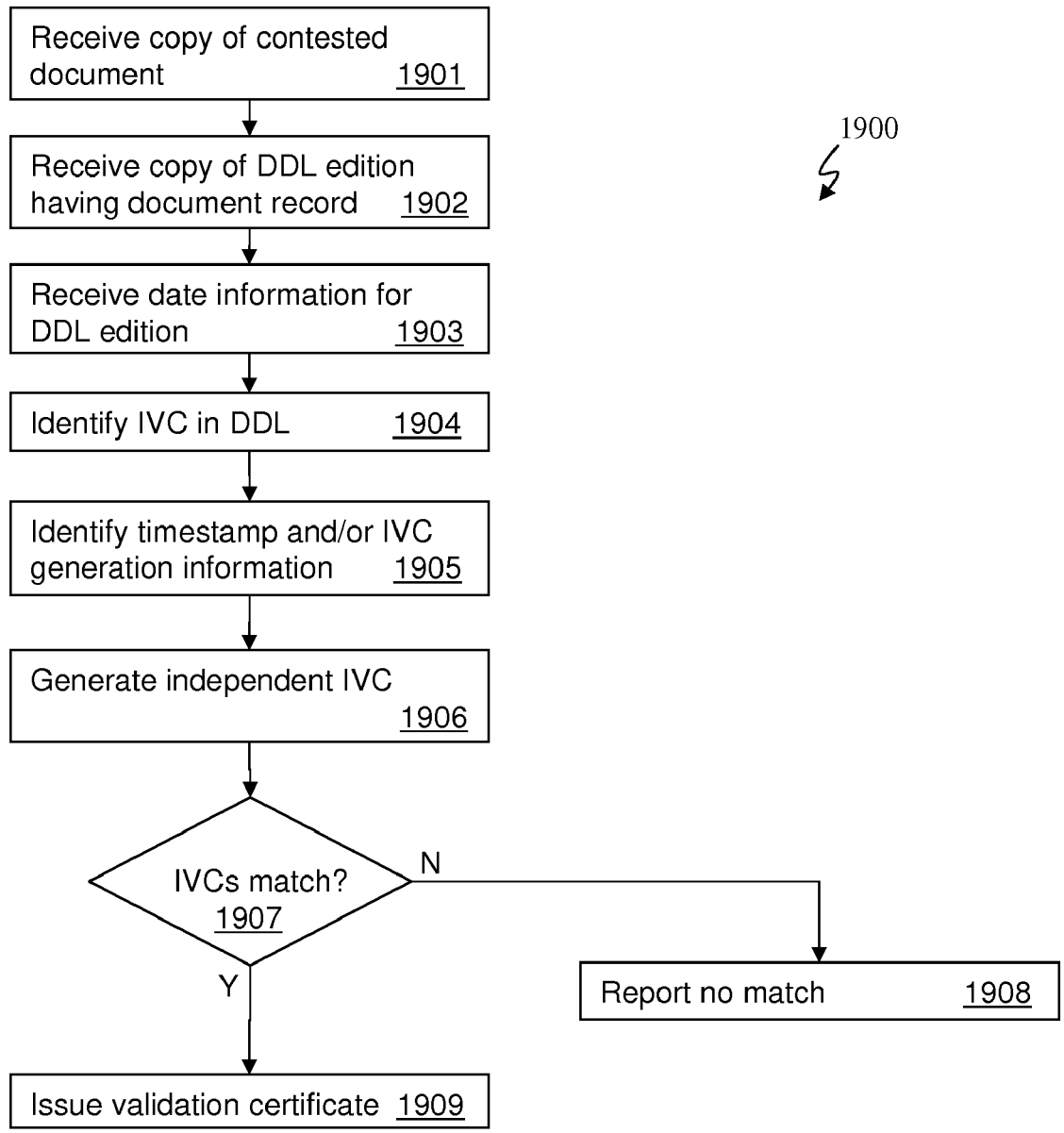
FIG. 19 illustrates a method of using a DDL to date prove a file using a trusted intermediary.

FIG. 19 illustrates a method 1900 of using a DDL to date prove a file using a TI, for example TI 401, providing a file integrity validation service for a fee. The TI may be TSA 302 and/or TTSA 102, or may be an entity entirely independent from one providing DDL publication and timestamping services. In box 1901, a copy of the contested file, for example one of documents 303, 308, 319, or another file, is received. A file copy may be received from the entity asserting a date and integrity, another entity questioning date and integrity, and/or a neutral entity possessing a copy, but taking no position on date and integrity. In some circumstances the TI may be required to hold the copy in confidence, for example if the file contains sensitive information.

A copy of the DDL edition having a record corresponding to the file is received in box 1902. This DDL edition is the one in which the file had been registered. The value of the DDL is higher when so many copies so widespread and under the control of so many different entities, having diverging interests, that forgery of the DDL edition would be readily detectable using another copy. Since the DDL edition contains one-way IVCs that free submitters from the concern that content of their registered files might be disclosed, DDL edition is used for ascertaining the IVC value, rather than reproducing a copy of the file. A DDL copy may be received from the entity asserting a date and integrity, another entity questioning date and integrity, and/or a neutral entity possessing a copy, but taking no position on date and integrity. In box 1903, date information for the DDL is received, for example the date at which the DDL edition was received by an entity other than the one publishing the DDL. The date information may come from the records of the entity providing a copy of the DDL edition and/or public records, for example public record 317, illustrated in FIGS. 3, 6, and 7.

The record is identified in the DDL, in box 1904, and additional information, including IVC generation information and/or a timestamp is identified in box 1905. If the validation process proves to be successful, the timestamp may be reported and/or included in a validation certificate issued by the TI as part of box 1909. An independent IVC is generated in box 1906, and it is tested for a match with the IVC in the DDL record in decision box 1907. If there is a mismatch, this is reported in box 1908. A validation certificate, for example validation certificate 407, 507 or 607, is issued in box 1909. If the record contains a timestamp issued by a TTSA, this may be reported on the certificate. Additionally, if the DDL contained digitally signed information from a TTSA, which enables trusted timestamping validation, for example a copy of a signed hash, such as encrypted hash value 111, a system similar to system 200, illustrated in FIG. 2, can be further utilized to establish the file date according to the timestamp. However, this requires that the challenger acknowledge the credibility of the TTSA. The TI may charge a fee to the entity asserting and/or challenging the document date, for providing the services. It should be understood that the order of the processes indicated in FIG. 19 may be changed without departing from the scope of the invention.

Figure 20:
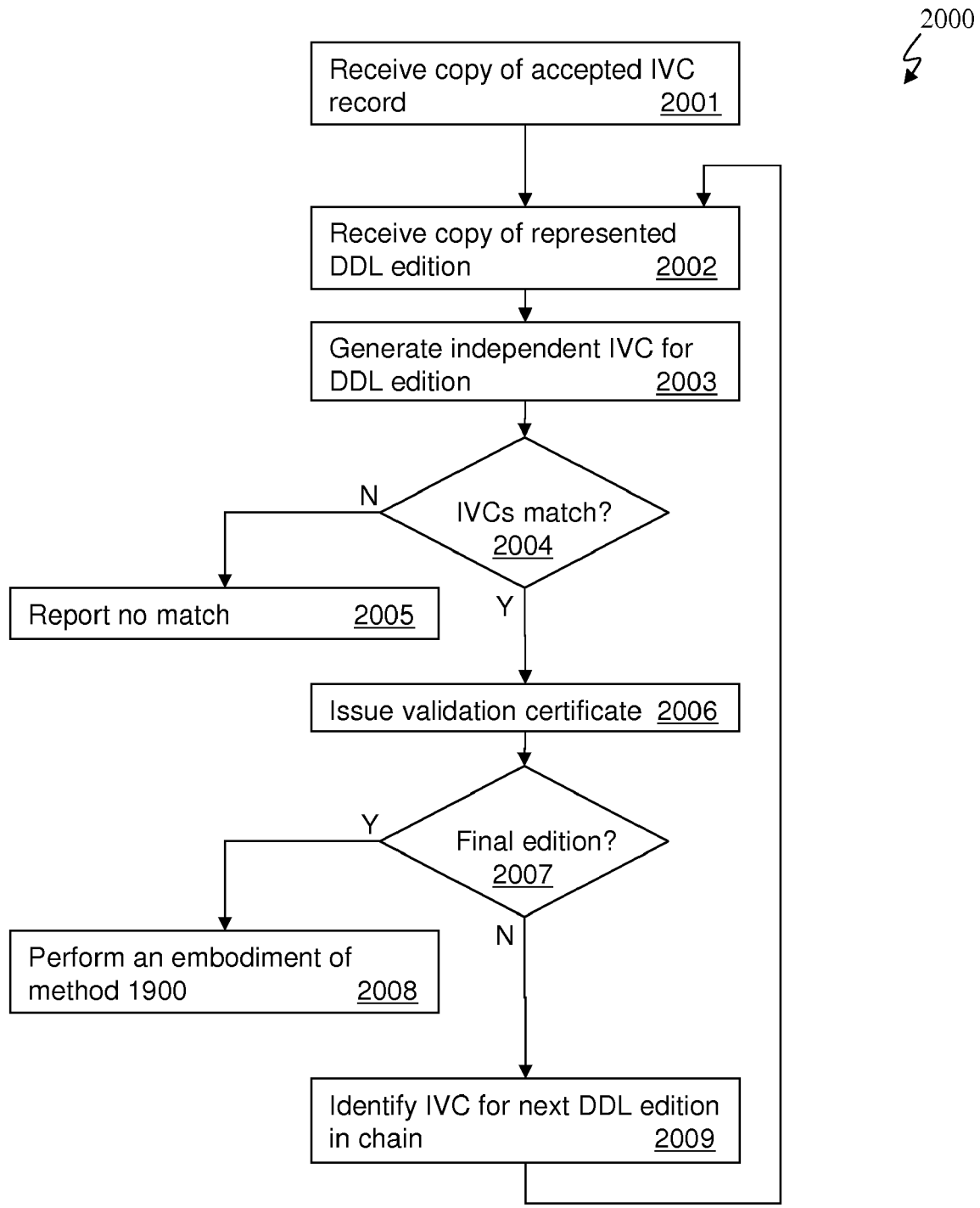
FIG. 20 illustrates another method of using a DDL to date prove a file using a trusted intermediary.

FIG. 20 illustrates a method 2000 of using a DDL to date prove a file using a trusted intermediary. Method 2000 can be used if the entity challenging the asserted date for the document also challenges the asserted date for the DDL edition containing the record for the disputed document. Effectively, method 2000 iterates using a public record or DDL edition date accepted by the challenger, thereby using the DDL chaining to establish a date for the DDL edition containing the record for the disputed document. This enables the use of method 1900, illustrated in FIG. 19. Method 2000 is illustrated as chaining backward in time, from the most recent DDL edition, through earlier editions. However, it should be understood that order is not important. The same purpose can be achieved by validating the chained DDL editions forward in time, which is the order in which they were publicized, or even randomly, so long as a complete validation chain can be established.

In box 2001, a copy of a record accepted by the challenger, or by court order, if method 2000 is performed as part of a litigation procedure, is received by a TI. This record may be a public record, for example public record 317, or a record in a copy of a DDL edition with a trusted date. In box 2002, a copy of the DDL edition represented by the record is obtained. An independent IVC is generated for the DDL edition in box 2003, and it is tested for a match in decision box 2004. If there is a mismatch, this is reported in box 2005. A validation certificate, for example validation certificate 517 or 617, is issued in box 2006. If the current DDL edition is the final one requiring testing, the DDL edition containing the record for the disputed document, as determined in decision box 2007, method 2000 performs an embodiment of method 1900 as part of the process represented by box 2008. As used herein, final edition should not be interpreted to mean last edition tested in time, since the order of testing can be rearranged. However, if the decision box 2007 indicates that the validation chain is incomplete and another DDL edition requires, in box 2009, the record for the next DDL edition to be tested is found in the DDL edition just validated. Method 2000 then returns to box 2002 to iterate the validation process for another DDL edition.

A method of establishing a file date comprises receiving a copy of the file; generating an IVC for the file; receiving a copy of an IVC representing the file; establishing a date for the received IVC; comparing the generated IVC with the received IVC; and generating a report responsive to the generated IVC matching the received IVC. The method may further comprise decrypting an encrypted TTSA record. The method may further comprise reporting the establishing a date for the received IVC as a date for the file. The method may further comprise iteratively establishing dates for chained DDL editions, wherein a first one of the chained DDL editions has an accepted date and a second one of the chained DDL editions comprises the received IVC.

Figure 21:
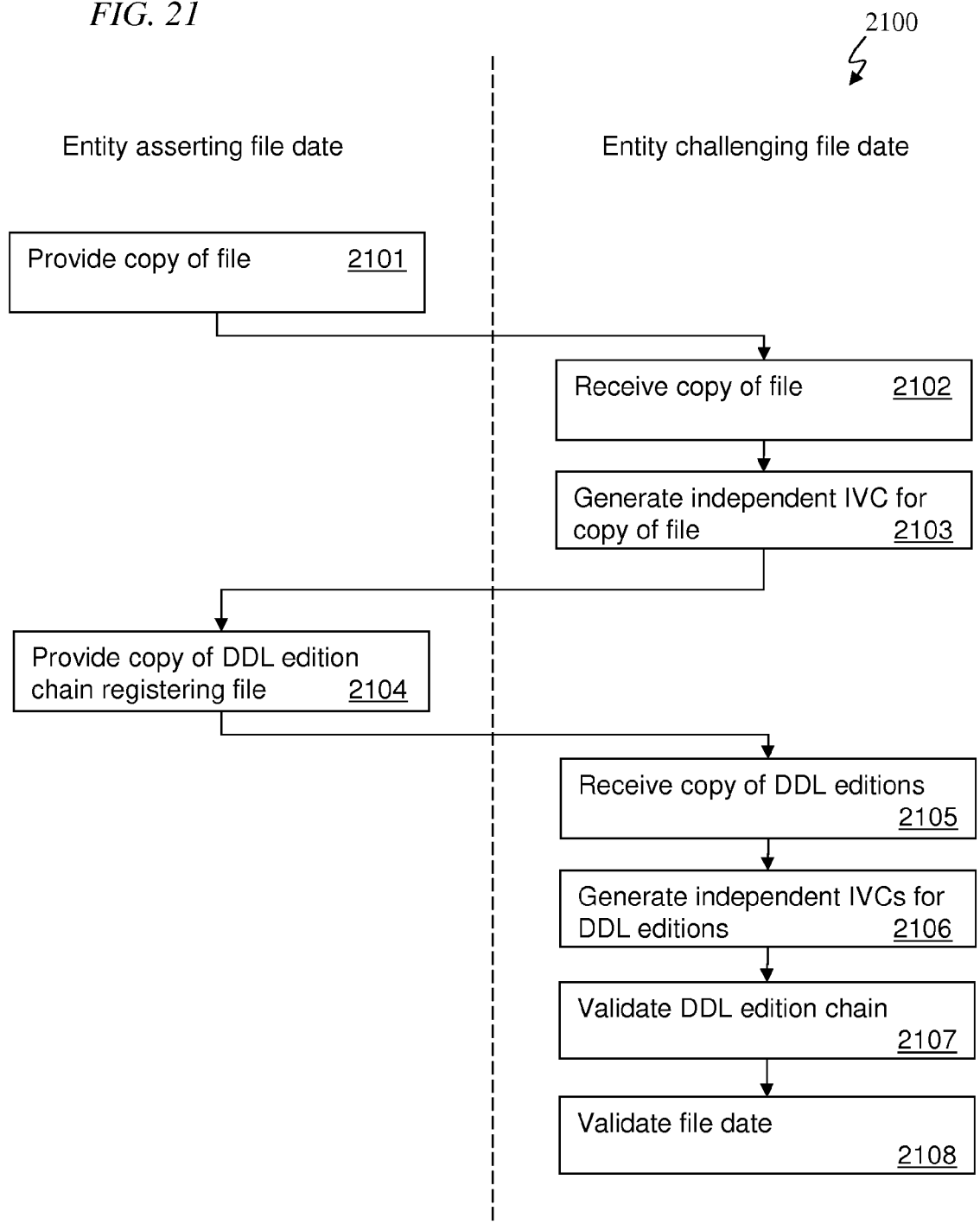
FIG. 21 illustrates a method of using a DDL to date prove a file without using a trusted intermediary.

FIG. 21 illustrates a method 2100 of using a DDL to date prove a file without using a trusted intermediary. As illustrated, method 2100 is split between an entity asserting file date and integrity and an entity challenging file date and integrity. Method 2100 may be used when the challenger is not barred from possessing a copy of the file. In some situations, for example, if challenger is not permitted to possess a copy of the file, embodiments of method 2100 may not be practical, and the use of a TI may be required.

In box 2101, the asserting entity provides a copy of the file, which is received by the challenger in box 2102. The challenger generates an IVC for the file in box 2103. In box 2104, the asserting entity provides copies of DDL editions that can be chained until a record that is accepted by the challenger, and these copies are received in box 2105. In some embodiments, the challenger may already possess the file and/or DDL editions, or may obtain copies from another source. The challenger generates IVCs for the DDL editions in box 2106, if a chaining validation process is required to establish a date for the DDL edition having a record representing the file. The chaining validation process is performed in box 2107, and the validation of the file with the DDL edition is performed in box 2108.

Figure 22:
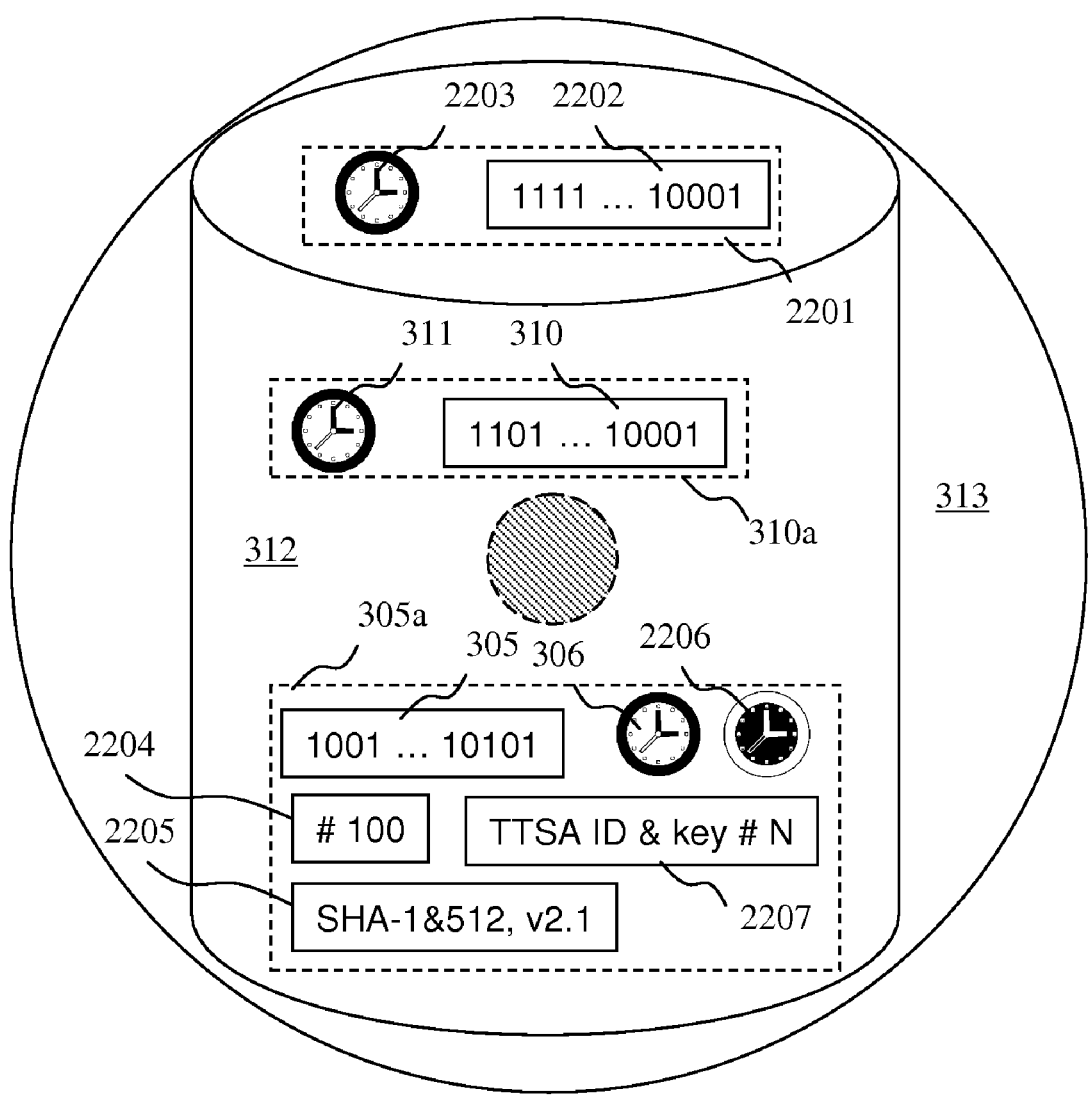
FIG. 22 illustrates an embodiment of a DDL apparatus.

FIG. 22 illustrates an embodiment of a DDL apparatus comprising media 313. The illustrated embodiment of media 313 comprises first DDL edition 312, although media 313 may further contain additional DDL editions and/or additional data, such as a URL database linking IVCs with URLs and/or a document archive holding copies of archived documents. First DDL edition 312 is illustrated as comprising records 305a, 310a, and a third DDL record 2201. Record 2201 comprises an IVC 2202, representing a DDL edition closed prior to the closing of first DDL edition 312, and a timestamp 2203 for IVC 2202. First DDL edition 312 may comprise additional records for other DDL editions and/or other documents.

Record 305a is illustrated as comprising a record index 2204, shown as 100, which indicates that record 305a was the 100th entry to first DDL edition 312, and indicia 2205 of the IVC generating functions and software version. Record 305a is further illustrated as comprising an encrypted timestamp record 2206, which will permit verification of timestamp 306 if the timestamping authority is trusted, and indicia 2207 that indicates both a TTSA identity and the specific TTSA key used for signing encrypted timestamp record 2206.

An apparatus for establishing a date of a document may comprise a computer readable medium containing a database edition, wherein the database edition comprises a first record and a second record. The database edition may further comprise a third record. The first record contains an IVC representing a first document or collection of documents received from a first database contributor or record submitter. The second record contains an IVC representing a second document or collection of documents received from a second database contributor or record submitter. The third record contains an IVC representing a prior database edition. The computer readable medium comprises one or more of an optical medium, such as a CD or DVD, a printed medium adapted to enable computer scanning and/or an optical character recognition (OCR) process, volatile or non-volatile memory. The computer readable medium may further contain a timestamp for the database edition. A record in the database edition may further contain one or more of IVC generation method indicia, a timestamp, an encrypted timestamp record, an identification of a timestamp authority, and a record index.

FIG. 23 illustrates a diagram of an embodiment of a document integrity verification apparatus 2300. Apparatus 2300 comprises a computing apparatus 2301 coupled to internet 808, printer 804, and media writer 819. Embodiments of computing apparatus 2301 are configured to operate within one or more of systems 300-600, and perform at least a portion of one or more of methods 900-2100. Embodiments of computing apparatus 2301 may comprise one or more of computing resources 101, user computer 802, control node 806, server 807, user computer 817, DDL node 813, a TTSA 102 computing resource, a TSA 302 computing resource, a TI 401 computing resource, an internet search engine resource, or any other computing resource interfacing with a DDL. In some embodiments, computing apparatus 2301 comprises an FPGA and/or an ASIC. Some of the illustrated elements may be modified or absent from a particular embodiment of computing apparatus 2301.

Computing apparatus 2301 comprises a CPU 2302, although it should be understood that a plurality of CPUs may be used within computing apparatus 2301. Computing apparatus 2301 further comprises memory 2303, which is coupled to CPU 2302. Memory 2303 may comprise volatile RAM, non-volatile RAM, and other computer-readable media, such as optical and magnetic media. Memory 2303 comprises digital document version 803, and an IVC generator 2304 which may contain the functionality of one or more of IVC generators 304, 309, 314, 320, and 810. IVC generator 2304 is illustrated as comprising data sequence modifier 2305 and modification rules 811, to enable generation of IVCs reproducible from a printed document version. Memory 2303 also comprises file processor 2306, which may comprise file parser 812, a word processor suitable for creating a document, software capable of intercepting network traffic and extracting attached documents, or software capable of creating and/or processing other types of computer files. Memory 2303 also comprises security module 809.

IVC database 814 is illustrated as comprising first DDL edition 312, second DDL edition 323, and another database 2307. Database 2307 may be another DDL edition or a database linking IVCs and URLs, which facilitates finding duplicate documents at different internet sites. Memory 2303 also comprises timing module 815, account database 816, cryptographic module 2308 and cryptographic keys 2309. Some embodiments of cryptographic module 2308 comprise the functionality of public key encryption module 109 and/or public key decryption module 109. Some embodiments of cryptographic keys 2309 comprise private key 110 and/or public key 210. Search engine database 2310 comprises data suitable for providing a search engine service, whether internet-based, intranet-based, or on a stand-alone computing resource. Search engine database 2310 comprises at least one set of data necessary to enable duplicate detection for at least some of the referenced documents. In some embodiments, this will be a set of IVCs, whether entire hash function message digests, incomplete portions of message digests, CRCs, or any other data string capable of representing document content integrity. Memory 2303 also comprises an internet browser 2311 which comprises document dating capability using a DDL, for example through DDL interface plug-in 2312. Control module 2313 may comprise a module for hosting a DDL submission or searching site, search engine database generation functionality, search engine hosting functionality, automatic document archiving functionality, automatic document search and IVC generation capability, automated IVC submission functionality, and any other computing functions described herein. Computing apparatus 2301 further comprises a network interface module 2314 for interfacing with a computer network, for example a local area network (LAN) and/or the internet.

An apparatus for establishing a date of a document may comprise a computer program embodied on a computer readable medium, and configured to be executed by a processor, whether as compiled instructions or interpreted instructions. The program may comprise one or more modules containing computer code. An apparatus for establishing a date of a document may comprise a computing device comprising a processor and one or more executable modules, either fixed in circuitry, in a memory containing computer code, or in a combination. An apparatus for establishing a date of a document may be configured to generate an IVC for a digital file, request remote generation of an IVC for a digital file, receive submitted IVCs from a plurality of submitters, and/or provide access to a DDL to enable searching by a user. An apparatus for enhancing a search engine operation may comprise a search engine module configured to generate a search engine database and/or generate a search result list for a searcher.

Although the invention and its advantages have been described herein, it should be understood that various changes, substitutions and alterations can be made without departing from the spirit and scope of the claims. Moreover, the scope of the application is not intended to be limited to the particular embodiments described in the specification. As one of ordinary skill in the art will readily appreciate from the disclosure, alternatives presently existing or developed later, which perform substantially the same function or achieve substantially the same result as the corresponding embodiments described herein, may be utilized. Accordingly, the appended claims are intended to include within their scope such alternatives and equivalents.

What is claimed is:

1. A computer implemented method of scoring a plurality of documents, comprising:
    identifying a plurality of linked documents;
    identifying linking documents that link to the linked documents;
    determining a score for each of the linked documents based on scores of the linking documents that link to the linked document; and
    processing the linked document according to the determined scores;
    wherein the improvement comprises:
    generating a first integrity verification code (IVC) for each of the linked documents;
    identifying at least one set of duplicates, using the generated IVCs, wherein identifying a set of duplicates comprises:
    comparing at least a first portion of the first IVC for the first document with a corresponding portion of the first IVC for a second document; and
    responsive to identifying a match between the compared IVC portions, performing a second comparison; and
    for a first linked document in the set of duplicates, determining a date for the first linked document, wherein determining a date comprises:
    searching a closed document dating list (DDL) edition, in a plurality of chained DDL editions, for a match with the first IVC for the first linked document;
    for the first linked document, adjusting at least one search result list generation parameter selected from the list consisting of:
    the score, and
    a ranking of the document in a search result list;
    wherein adjusting the parameter comprises increasing or decreasing the parameter based on the date of the first document.

2. The method of claim 1 further comprising:
    submitting at least one of the generated IVCs to a DDL.

3. The method of claim 1 wherein generating an IVC comprises:
    generating a hash function message digest.

4. The method of claim 1 wherein generating an IVC comprises:
    calculating a cyclic redundancy check (CRC).

5. The method of claim 1 wherein performing a second comparison comprises:

comparing a second portion of the first IVC for the first document with a corresponding portion of the first IVC for the second document.

6. The method of claim 1 wherein performing a second comparison comprises:
generating a second IVC for each of the first document and the second document; and
comparing at least a portion of the second IVC for the first document with a corresponding portion of the second IVC for the second document.

7. The method of claim 1 wherein identifying a set of duplicates comprises:
comparing a size of the first document with a size of a second document.

8. The method of claim 1 wherein adjusting the document score comprises:
changing the score to a value closer to a score of a duplicate of the first document.

9. The method of claim 1 wherein adjusting a ranking of the document in a search result list comprises:
moving a list item indicating the first document closer to a list item indicating a duplicate of the first document, thereby displacing another list item in the search result list.

10. The method of claim 1 wherein adjusting a ranking of the document in a search result list comprises:
moving a list item indicating the first document away from a list item indicating a duplicate of the first document, thereby displacing another list item in the search result list.

11. The method of claim 1 further comprising:
adjusting a score for at least one document not identified has having a duplicate, and linked to the first document.

12. The method of claim 1 wherein identifying a set of duplicates comprises:
identifying, within each of the linked documents, content that is determinative of duplication and content that is not determinative of duplication, and
wherein the set of duplicates comprises a second document having determinative content identical with the first document and nondeterminative content differing from the first document.

13. The method of claim 1 further comprising:
presenting, to a searcher, an option selection, wherein the option selection comprises a first option for grouping document duplicates in the search list and a second option for presenting a diverse search list.

14. The method of claim 1 further comprising:
receiving, from a searcher, an option selection indication for processing duplicate documents; and generating the search result list responsive to the received preference.

15. The method of claim 1 further comprising:
generating the search result list as a hierarchical list, wherein a first list level is diverse with respect to document duplicates, and a lower list level identifies document duplicates.

16. A computer program embodied on a non-transitory computer executable medium and configured to be executed by a processor, the program comprising:
code for identifying a plurality of linked documents;
code for identifying linking documents that link to the linked documents;
code for determining a score for each of the linked documents based on scores of the linking documents that link to the linked document; and
code for determining a date for a first document in the plurality of linked documents, wherein determining a date comprises:
generating an integrity verification code (IVC) for the first document; and
searching a closed document dating list (DDL) edition, in a plurality of chained DDL editions, for a match with the IVC for the first document;
code for identifying at least one set of duplicates, using the IVC, wherein identifying a set of duplicates comprises:
comparing at least a first portion of the IVC for the first document with a corresponding portion of an IVC generated for a second document; and
responsive to identifying a match between the compared IVC portions, performing a second comparison; and
code for adjusting at least one search result list generation parameter for the first linked document, the parameter selected from the list consisting of:
the score, and
a ranking of the document in a search result list;
wherein adjusting the parameter comprises increasing or decreasing the parameter based on the date of the first document.

* * * * *